(12) United States Patent
Torii et al.

(10) Patent No.: US 10,817,243 B2
(45) Date of Patent: Oct. 27, 2020

(54) CONTROLLING A USER INTERFACE BASED ON CHANGE IN OUTPUT DESTINATION OF AN APPLICATION

(71) Applicant: SONY CORPORATION, Tokyo (JP)

(72) Inventors: Kuniaki Torii, Kanagawa (JP); Kosuke Yoshitomi, Kanagawa (JP); Hikotatsu Chin, Tokyo (JP); Katsuya Hyodo, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 763 days.

(21) Appl. No.: 14/524,177

(22) Filed: Oct. 27, 2014

(65) Prior Publication Data

US 2015/0128065 A1 May 7, 2015

(30) Foreign Application Priority Data

Nov. 6, 2013 (JP) .................................. 2013-229961

(51) Int. Cl.
*G06F 3/048* (2013.01)
*G06F 3/14* (2006.01)
*G09G 5/00* (2006.01)

(52) U.S. Cl.
CPC ............. *G06F 3/1454* (2013.01); *G09G 5/00* (2013.01); *G09G 2340/0407* (2013.01); *G09G 2340/0464* (2013.01); *G09G 2340/0492* (2013.01); *G09G 2340/14* (2013.01); *G09G 2354/00* (2013.01); *G09G 2358/00* (2013.01)

(58) Field of Classification Search
CPC . G06F 3/1454; G06F 9/46; G06F 9/06; G06F 9/00; G06F 8/20; G06F 21/10; G06F 2221/2135; G06F 2221/07; G09G 5/00; G06Q 10/06; G06Q 10/00; G06Q 10/087; G06Q 10/107; H04M 1/72552; H04M 1/72; H04L 67/16; H04L 12/2807; H04L 69/329; H04L 69/322; H04L 51/28; H04L 2463/101
USPC ......................................................... 715/746
See application file for complete search history.

(56) References Cited

U.S. PATENT DOCUMENTS

| | | | |
|---|---|---|---|
| 2005/0140574 A1* | 6/2005 | Tamura .................. | G06F 1/1616 345/9 |
| 2009/0150794 A1* | 6/2009 | Sano ...................... | G08C 17/00 715/740 |
| 2011/0197147 A1* | 8/2011 | Fai ......................... | G06F 1/1639 715/753 |
| 2012/0089923 A1* | 4/2012 | Pettit ..................... | G06F 9/4445 715/746 |
| 2012/0274656 A1* | 11/2012 | Kang ..................... | G06F 1/1632 345/619 |

(Continued)

FOREIGN PATENT DOCUMENTS

| | | |
|---|---|---|
| JP | 2002-259114 A | 9/2002 |
| JP | 2005-129068 A | 5/2005 |

*Primary Examiner* — Mahelet Shiberou
(74) *Attorney, Agent, or Firm* — Chip Law Group

(57) ABSTRACT

There is provided an information processing apparatus including an extraction part configured to extract, when an output destination is changed to a recipient candidate device, a change in a screen layout determined in accordance with an output environment of the recipient candidate device, and a notification controller configured to perform control to execute notification of the change in the screen layout extracted by the extraction part.

11 Claims, 16 Drawing Sheets

(56) References Cited

U.S. PATENT DOCUMENTS

| | | | |
|---|---|---|---|
| 2013/0159917 A1* | 6/2013 | Loebach | G06F 3/048 715/778 |
| 2013/0308055 A1* | 11/2013 | Shigemasa | H04N 5/262 348/563 |
| 2013/0321329 A1* | 12/2013 | Tokutake | G06F 3/0487 345/174 |
| 2014/0168277 A1* | 6/2014 | Ashley | G06F 3/1446 345/672 |
| 2014/0218266 A1* | 8/2014 | Chen | G06F 3/1446 345/1.3 |
| 2014/0359472 A1* | 12/2014 | Lefor | G06F 3/0481 715/746 |
| 2015/0058735 A1* | 2/2015 | Nagase | H04N 7/15 715/733 |
| 2015/0088669 A1* | 3/2015 | Kwak | G06F 17/212 705/14.73 |
| 2020/0167121 A1* | 5/2020 | Shim | G06F 3/1454 |

\* cited by examiner

FIG. 2
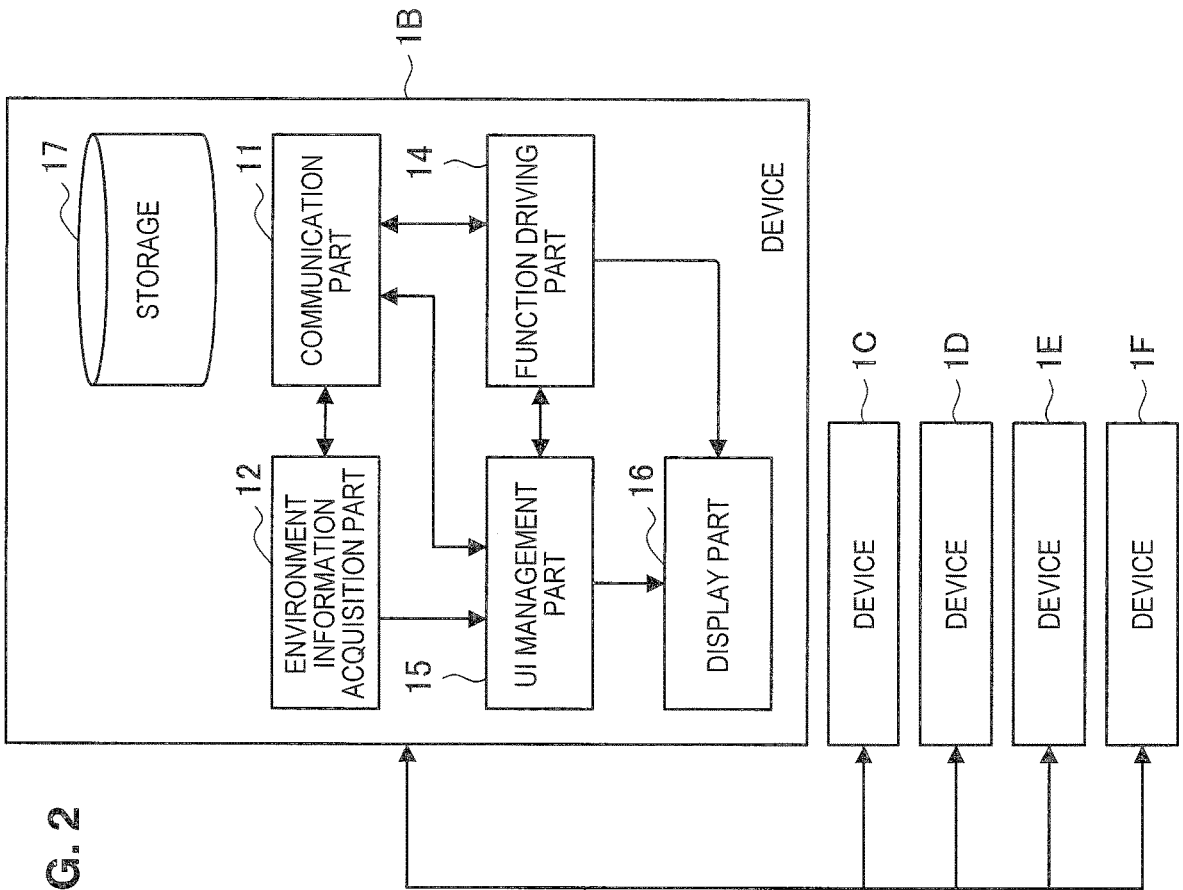
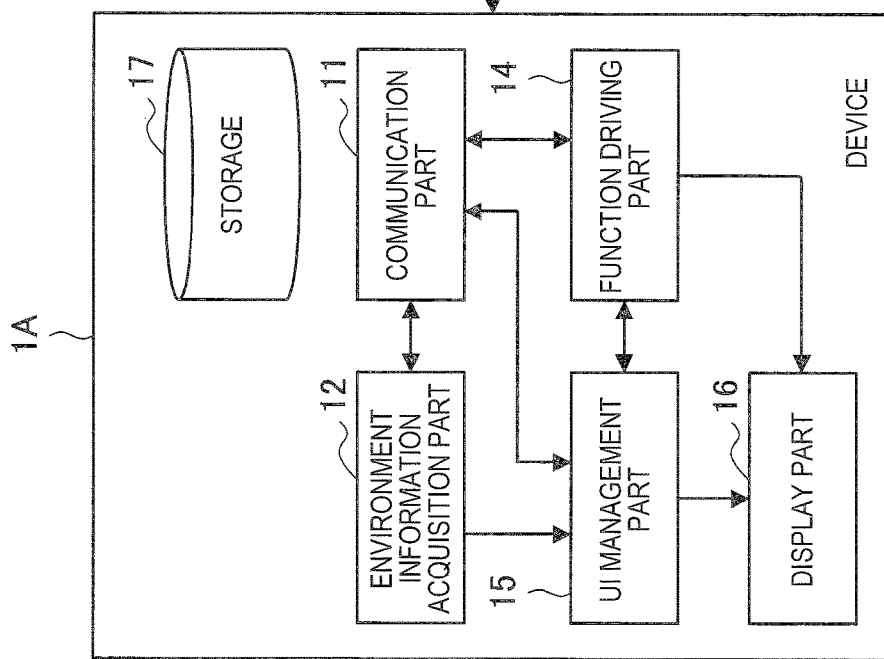

CONTROLLING A USER INTERFACE BASED ON CHANGE IN OUTPUT DESTINATION OF AN APPLICATION

CROSS REFERENCE TO RELATED APPLICATIONS

This application claims the benefit of Japanese Priority Patent Application JP 2013-229961 filed Nov. 6, 2013, the entire contents of which are incorporated herein by reference.

BACKGROUND

The present disclosure relates to an information processing apparatus and a control method. It has been possible to change an output destination of a user interface (UI) presented by a target application during execution to another device (recipient device). Regarding such switching to a recipient device, JP 2005-129068A discloses, for example, a technique of selecting a recipient device to be changed to on the UI of a transmitting device. Further, JP 2002-259114A discloses a technique of providing information for a next user operation taking into consideration a current state of a target application, for the purpose of improving operability.

SUMMARY

Here, in the case where a recipient device (output destination) is changed to another recipient device, a user interface (UI) presented by a target application to be executed changes in accordance with an output environment of the recipient device. For example, if the same application is executed in different devices, screen layouts on the respective devices are different from each other depending on the levels of resolutions. However, in the past, it has been only the fact that the level of resolution has been changed that the user is notified of after the output destination has actually been changed, and no notification has been made about the changes on the UI. It has been necessary to check the change on the UI by the user himself/herself. As a result, in order to operate the UI in an optimum environment, it has been necessary to perform processes of trial and error for each device by actually changing output destinations and causing each device to display a UI, which involved a great amount of time and effort.

Further, none of JP 2005-129068A and JP 2002-259114A mention about notifying in advance the user of how the UI changes in accordance with each output destination when selecting an output destination. In light of the foregoing, the present disclosure suggests an information processing apparatus and a control method which are capable of performing notification of the change in the screen layout for each recipient candidate device before changing the output destination.

According to an embodiment of the present disclosure, there is provided an information processing apparatus including an extraction part configured to extract, when an output destination is changed to a recipient candidate device, a change in a screen layout determined in accordance with an output environment of the recipient candidate device, and a notification controller configured to perform control to execute notification of the change in the screen layout extracted by the extraction part.

According to another embodiment of the present disclosure, there is provided a control method including extracting, when an output destination is changed to a recipient candidate device, a change in a screen layout determined in accordance with an output environment of the recipient candidate device, and performing control to execute notification of the change in the extracted screen layout.

According to one or more of embodiments of the present disclosure, it becomes possible to perform notification of the change in the screen layout for each recipient candidate device before changing the output destination. Note that the effects described here are not necessarily limitative. With or in the place of the above effects, there may be achieved the effects described in this specification or other effects that are clear based on the description of this specification.

BRIEF DESCRIPTION OF THE DRAWINGS

FIG. 2 is a block diagram showing a configuration of the recipient device changing system according to the present embodiment;

DETAILED DESCRIPTION OF THE EMBODIMENT(S)

Figure 1:
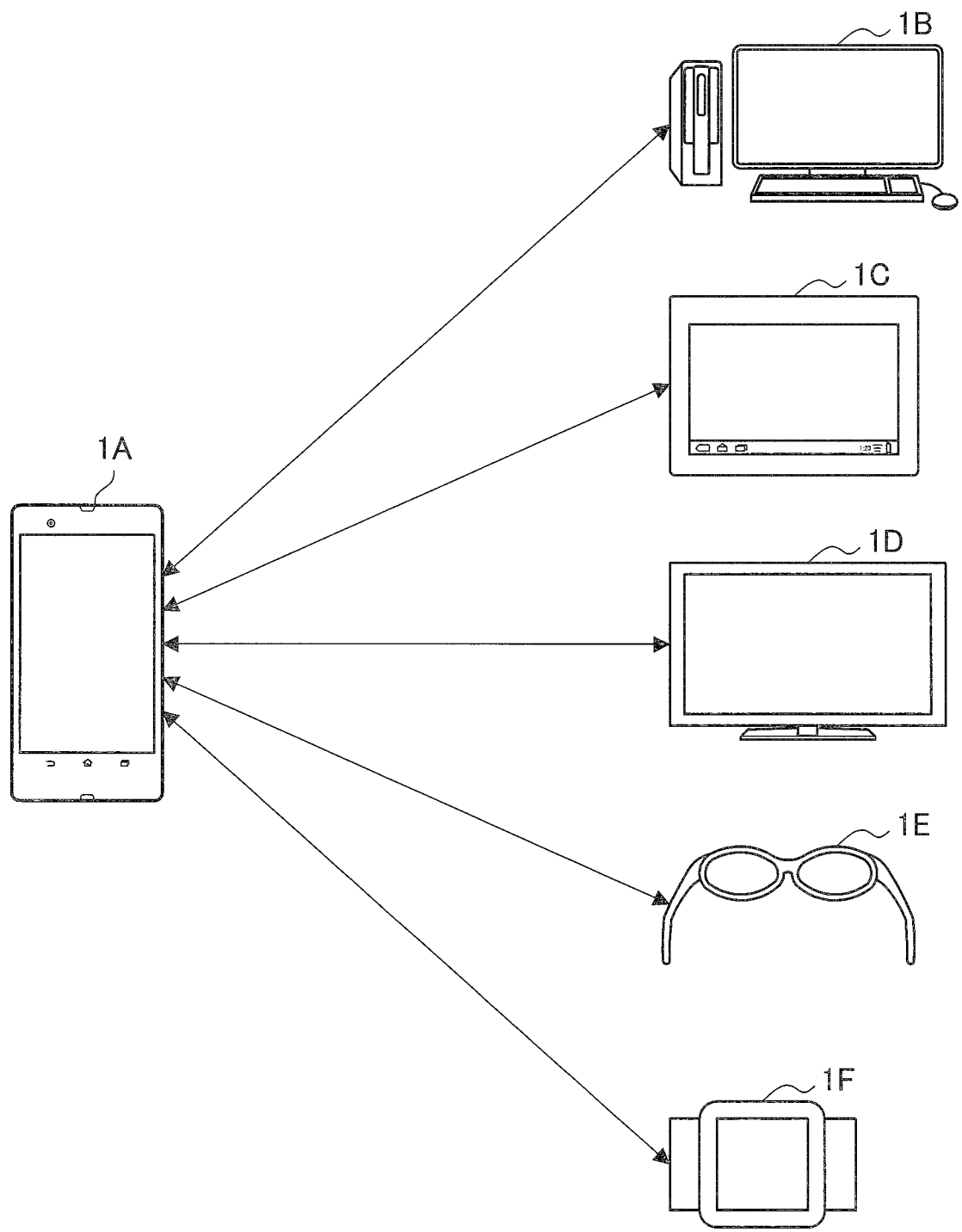
FIG. 1 is a diagram illustrating an overview of a recipient device changing system according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Further, the description will be given in the following order.

1. Overview of recipient device changing system according to an embodiment of the present disclosure
2. System configuration
   2-1. First system configuration
   2-2. Second system configuration
   2-3. Third system configuration
3. Operation processing
4. Specific notification example
   4-1. UI-change notification in accordance with change of devices
   4-2. UI-changed notification triggered by change in user environment
   4-3. UI-change notification in accordance with characteristics of recipient candidate devices and types of display contents
   4-4. UI-changed notification when output is performed by multiple recipient candidate devices
5. Modified example
6. Conclusion

1. Overview of Recipient Device Changing System According to an Embodiment of the Present Disclosure First, with reference to FIG. 1, an overview of a recipient device changing system according to an embodiment of the present disclosure will be described. As shown in FIG. 1, the recipient device changing system according to the present embodiment includes a device (transmitting device) 1A that is currently executing an application, and multiple devices (recipient candidate devices) 1B to 1F that are candidates for a destination to which the distribution is to be changed.

The devices 1A to 1F are each an example of an information processing apparatus according to an embodiment of the present disclosure. For example, as shown in FIG. 1, the device 1A is achieved by a smartphone (smart mobile phone terminal), the device 1B is achieved by a personal computer (PC), the device 1C is achieved by a tablet terminal, the device 1D is achieved by a TV, the device 1E is achieved by a glasses-type head mounted display (HMD), and the device 1F is achieved by a watch-type device.

Here, in the case where an application is currently executed in the device 1A and a user interface (UI) based on the application during execution is displayed on a display part of the device 1A, let us assume that the output destination is changed to any one of the other devices 1B to 1F. In this case, the UI's to be presented by the target application differ depending on the environments (for example, resolution, presence/absence of a speaker, a type of an input interface selected from audio input, keyboard input, and touch panel input, and a type of the device) of the devices 1B to 1F to be the output destinations. In the past, what sort of UI is to be presented at the output destination has not been shown until after the UI has actually been switched, and, in order to operate the UI in an optimum environment, it has been necessary to perform processes of trial and error by actually displaying UI's in the respective environments.

Accordingly, in the present embodiment, there is provided a system for providing a user with a change in the UI (that is, change in screen layout) for each recipient candidate device before the output destination is actually changed to the recipient candidate device. In this way, the user grasps the change in the UI for each device and can select an optimum UI before the output destination (recipient) is actually switched. Heretofore, an overview of a recipient device changing system according to an embodiment of the present disclosure has been described. Next, with reference to FIGS. 2 to 4, a system configuration according to an embodiment of the present disclosure will be described.

2. System Configuration

<2-1. First System Configuration>

FIG. 2 is a block diagram showing a configuration of the recipient device changing system according to the present embodiment. As shown in FIG. 2, the devices 1A to 1F (information processing apparatuses) have the same configuration as each other, and may each become a transmitting device and a recipient device. In the present embodiment, the description will be made assuming that the device 1A is a transmitting device that is currently executing an application and the devices 1B to 1F are recipient candidate devices that are to execute the application next. Note that the configuration of each of the devices 1C to 1F, which are recipient candidates, is the same as the configuration of the device 1B, and hence is not shown. As shown in FIG. 2, the device 1A includes a communication part 11, an environment information acquisition part 12, a function driving part 14, a UI management part 15, a display part 16, and a storage 17.

(Communication Part)

The communication part 11 is connected to an external device via wire or radio, and has a function of transmitting/receiving data. For example, the communication part 11 according to the present embodiment has a function of transmitting/receiving data to/from a device nearby which is to be a recipient candidate, using Bluetooth (registered trademark), Wi-Fi (registered trademark), infrared communication, near field communication, and the like. The communication part 11 according to the present embodiment receives, from the devices 1B to 1F which are recipient candidates, information about a screen layout (hereinafter, also referred to as UI usage state information) that is determined in accordance with an output environment of the recipient candidate device.

(Environment Information Acquisition Part)

The environment information acquisition part 12 detects an event that triggers a change in the output destination (change in UI accompanied by the change in the output destination), such as a user action and an environment around the device 1A. The user action includes a user operation, and, for example, the environment information acquisition part 12 is achieved by an operation input part having a physical structure such as a button or a switch, a touch sensor accepting an operation input on a display screen, a camera, a microphone, and the like, and acquires the user operation (input information). Further, the user action also includes movement and a current position of the user, and, for example, the environment information acquisition part 12 may be achieved by a measurement part performing positional determination using a global positioning system (GPS) and Wi-Fi radio waves, and may acquire a motion of the user by being achieved by an acceleration sensor or a gyro sensor. Further, the environment around the device 1A includes a status of the user using the device 1A, and the environment information acquisition part 12 may be achieved by a camera (imaging part) or an analysis part which performs facial recognition of users of the device 1A on the basis of a captured image taken by the camera and analyzes the number of the users and the ages (adult/child) of the users.

(Function Driving Part)

The function driving part 14 performs driving (execution) control of the target application. The function driving part 14 starts driving of the target application in accordance with the user operation, for example. The screens presented by the target application driven by the function driving part 14 is output from the display part 16.

(UI Management Part)

The UI management part 15 manages a screen layout of a UI presented by a target application being driven by the function driving part 14. To be specific, the UI management part 15 determines the screen layout of the UI presented by the target application in accordance with an output environment (resolution, type of the display device, or the like) of the display part 16. Further, the UI management part 15 also functions as an extraction part which extracts a change in the screen layout of the UI in the case where the UI presented by the target application is output from another device. The UI management part 15 (extraction part) compares, for example, UI usage state information acquired from another device (recipient candidate device) with the current UI usage state information, and extracts a difference between the pieces of information included in the respective screens as the change in the screen layout. Such extraction of the change in the screen layout of the UI is triggered by a change in the environment that surrounds the transmitting device, such as the case where the transmitting device comes close to the recipient candidate device or the case where the number of users is changed, by an operation of calling a recipient changing menu performed by the user, and the like.

Further, the UI management part 15 also functions as a notification controller which perform control to notify the user of the extracted change in the screen layout through the display part 16 or an audio output part (not shown). When performing notification through the display part 16, the notification is performed in a manner that the screen layout for each recipient candidate device or the change in the screen layout is shown on the notification screen, which is also a screen for selecting a recipient device, by using a text, an icon, a thumbnail image, or the like. In addition, the UI management part 15 is also capable of performing management in the case where the UI presented by the target application is separately displayed in multiple devices.

(Display Part)

The display part 16 displays various types of UI's provided by the application driven by the function driving part 14, and performs notification of the change in the screen layout of the UI for each recipient candidate device in accordance with the control performed by the UI management part 15. Further, the display part 16 may be achieved by a liquid crystal display (LCD) or an organic light-emitting diode (OLED).

(Storage)

The storage 17 stores a program for each structural element of the device 1A (information processing apparatus) to execute processing, application data, pieces of information, and the like. Heretofore, a configuration of the device 1A as an example of the information processing apparatus according to the present embodiment has been described. Note that the respective functions of the environment information acquisition part 12, the function driving part 14, and the UI management part 15 of the device 1A described above may each be achieved by a microcomputer including a central processing unit (CPU), read only memory (ROM), random access memory (RAM), non-volatile memory, and an interface part, which is mounted on the device 1A.

As shown in FIG. 2, since the configuration of the device 1B is the same as the configuration of the device 1A, the detailed explanation will be omitted. Note that, in the case where the device 1B is a recipient candidate device for the device 1A, the UI management part 15 of the device 1B determines, in response to a request from the device 1A, a screen layout of the UI presented by the target application in accordance with the output environment of the display part 16 of the device 1B, and transmits the screen layout as UI usage state information to the device 1A. Further, the function driving part 14 of the device 1B serving as the recipient candidate starts driving the target application in accordance with an instruction (command to start output by the target application) issued from the device 1A. In this case, the function driving part 14 of the device 1B acquires context of the target application from the device 1A, and takes over the current driving state of the target application.

The recipient device changing system described above is configured from multiple devices 1A to 1F, and, in the case where one of the devices 1A to 1F becomes the transmitting device, the other devices become recipient candidate devices. Here, the configuration of the recipient device changing system according to the present embodiment is not limited to the example shown in FIG. 2, and may be achieved by other system configurations which will be described below, for example.

<2-2. Second System Configuration>

Figure 3:
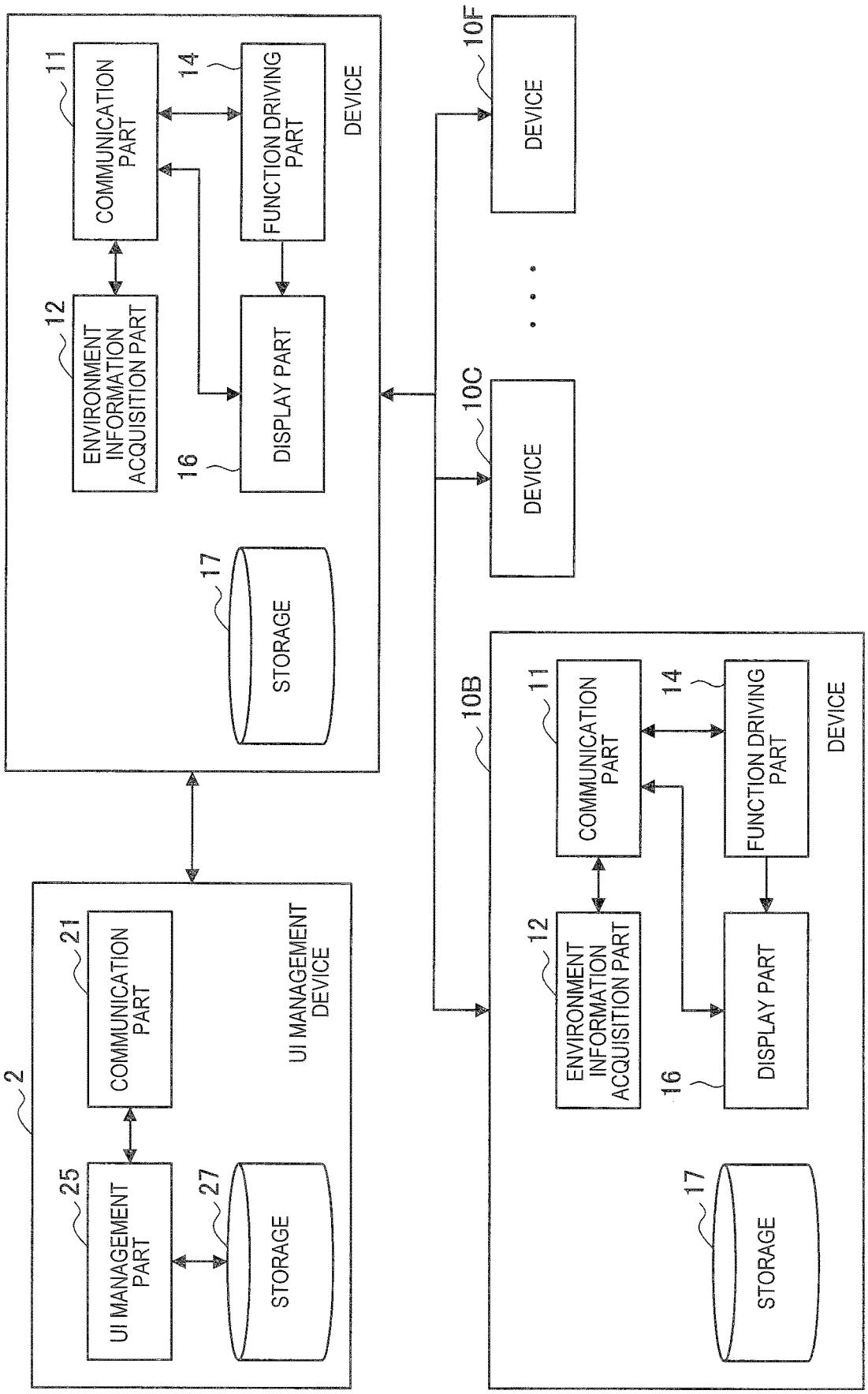
FIG. 3 is a block diagram illustrating a second system configuration of the recipient device changing system according to the present embodiment.

FIG. 3 is a block diagram illustrating a second system configuration of the recipient device changing system according to the present embodiment. As shown in FIG. 3, the second system configuration includes multiple devices 10A to 10F and a UI management device 2. The UI management device 2 may be connected via wire or radio to the device 10A among the multiple devices 10A to 10F, the device 10A being currently executing an application. Further, the second system configuration shown in FIG. 3 is different from the first system configuration described with reference to FIG. 2 in that the UI management device 2 (information processing apparatus according to the present disclosure) executes the function of the UI management part 15 that each of the devices 1A to 1F (information processing apparatus according to the present disclosure) in the first system configuration includes. Hereinafter, the configuration of the UI management device 2 included in the second system configuration will be described specifically.

(UI Management Device)

As shown in FIG. 3, the UI management device 2 includes a communication part 21, a UI management part 25, and a storage 27. The communication part 21 is connected to the device 10A which is to become a transmitting device via wire or radio, and transmits/receives data. Further, the communication part 21 according to the present embodiment receives, from the device 10A which is a transmitting device, output environment information of the device 10A and output environment information of the devices 10B to 10F which are to be recipient candidate devices.

The UI management part 25 manages a screen layout of a UI presented on each device by the target application. To be specific, the UI management part 25 acquires pieces of output environment information of the respective devices 10A to 10F through the communication part 21 from the device 10A, and, on the basis of the pieces of output environment information, determines the screen layout of the UI presented by the target application for each device.

Further, the UI management part 25 compares the screen layout of the UI presented by the device 10A in which the target application is currently being driven with the screen layouts of the UI's presented by the devices 10B to 10F which are recipient candidates, and extracts changes in the screen layouts.

Then, the UI management part 25 performs control to notify the user of the extracted changes in the screen layouts through the display part 16 or an audio output part (not shown) of the device 10A. To be specific, information indicating the change of the screen layouts is transmitted from the communication part 21 to the device 10A. The storage 27 stores a program for each structural element of the UI management device 2 (information processing apparatus) to execute processing, application data, pieces of information, and the like. Heretofore, a configuration of the UI management device 2 has been described specifically. Note that the UI management device 2 may be achieved by a user terminal such as a PC, a smartphone, or a tablet terminal, or may be achieved by a server device on a network.

(Devices)

Since the multiple devices 10A to 10F have configurations identical to each other, illustration of the devices 10C to 10F will be omitted in FIG. 3. Further, among the multiple devices 10A to 10F, the transmitting device that is currently driving the application establishes connection to the UI management device 2, and the transmitting device transmits pieces of output environment information acquired from other devices (recipient candidate devices) which are to be recipient candidates to the UI management device 2. In the example shown in FIG. 3, let us assume that the device 10A is the transmitting device that is currently driving the application, and the configuration of the device 10A will be described below, the device 10A serving as a representative among the devices 10A to 10F all having the same configuration.

As shown in FIG. 3, the device 10A includes a communication part 11, an environment information acquisition part 12, a function driving part 14, a display part 16, and a storage 17. The functions of the respective structural elements are the same as the functions of the structural elements having the corresponding reference numerals described with reference to FIG. 2. However, the communication part 11 according to the present embodiment transmits the pieces of output environment information acquired from the devices 10B to 10F, which are recipient candidates, together with the output environment information of the device 10A to the UI management device 2, and inquires about the change in the screen layout of the UI provided by the target application for each device.

Further, the display part 16 displays a notification screen indicating the change in the screen layout for each device received from the UI management device 2 by the communication part 11. In addition, the communication part 11 transmits an instruction to start driving the target application and the context of the target application acquired from the function driving part 14 to the selected recipient devices. Heretofore, the configuration of the device 10A has been described as a representative of the multiple devices. Note that the device 10B, which is a recipient candidate, transmits the output environment information of the device 10B in response to the request from the device 10A that is currently driving the application. Further, in the case where a target application driving instruction from the device 10A is issued, the device 10B starts driving the target application.

<2-3. Third System Configuration>

Figure 4:
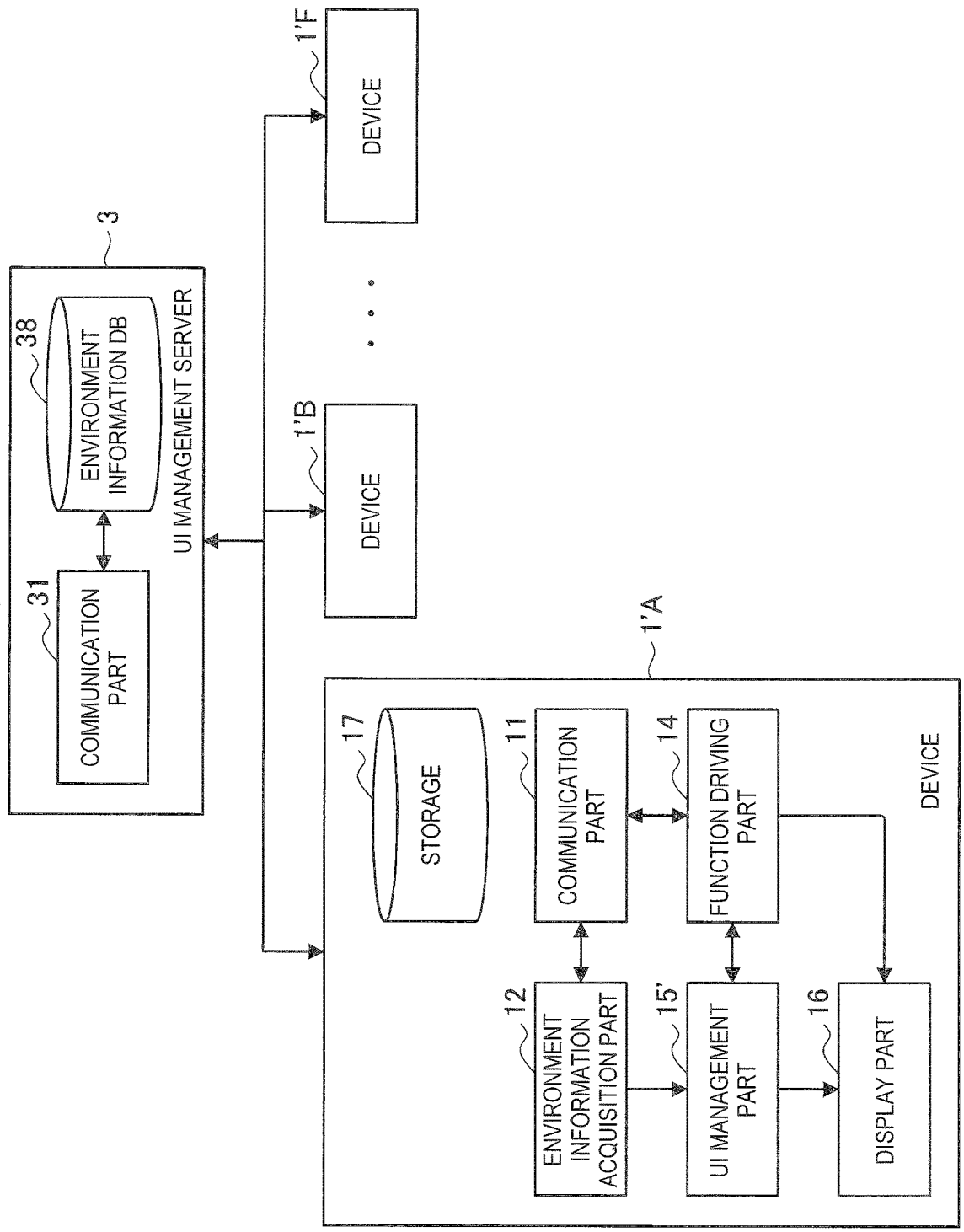
FIG. 4 is a block diagram illustrating a third system configuration of the recipient device changing system according to the present embodiment.

Next, with reference to FIG. 4, another system configuration of the recipient device changing system according to the present embodiment will be described. FIG. 4 is a block diagram illustrating a third system configuration of the recipient device changing system according to the present embodiment.

As shown in FIG. 4, the third system configuration includes multiple devices 1'A to 1'F and a UI management server 3. The UI management server 3 is connected to the multiple devices 1'A to 1'F via wire or radio. Further, the third system configuration shown in FIG. 4 differs from the second system configuration in that the UI management server 3 collects pieces of output environment information of the respective devices 1'A to 1'F. Hereinafter, the configuration of the UI management server 3 included in the third system configuration will be described specifically.

(UI Management Server)

As shown in FIG. 4, the UI management server 3 includes a communication part 31 and an environment information DB 38. The communication part 31 is connected to the devices 1'A to 1'F via wire or radio, and transmits/receives data. To be specific, the communication part 31 receives pieces of output environment information of the respective devices 1'A to 1'F from the devices 1'A to 1'F. Further, the communication part 31 transmits output environment information of another device in response to a request from one of the devices 1'A to 1'F. The environment information DB 38 is a storage which stores the pieces of output environment information of the respective devices 1'A to 1'F received from the devices by the communication part 31.

(Devices)

Subsequently, devices included in the third system configuration will be described. Since the multiple devices 1'A to 1'F have configurations identical to each other, illustration of the device 1'B to 1'F will be omitted in FIG. 4. Further, among the multiple devices 1'A to 1'F, the device that is currently driving the application becomes the transmitting device and establishes connection to the UI management server 3, and receives pieces of output environment information of other devices which are to be recipient candidates. Hereinafter, configuration of the device 1'A will be described as a representative among the devices 1'A to 1'F.

As shown in FIG. 4, the device 1 'A includes a communication part 11, an environment information acquisition part 12, a function driving part 14, a UI management part 15', a display part 16, and a storage 17. Since the functions of the respective structural elements are the same as the functions of the structural elements having the corresponding reference numerals described with reference to FIG. 2, the description thereof will be omitted. Note that the communication part 11 according to the present system configuration receives the pieces of output environment information of the respective device 1'B to 1'F, which are the recipient candidates, from the UI management server 3.

The UI management part 15' acquires the pieces of output environment information of the respective recipient candidate devices through the communication part 11 from the UI management server 3, and, on the basis of the pieces of output environment information, determines the screen layout of the UI (UI usage state information) presented by the target application for each recipient candidate device. Then, the UI management part 15' compares the screen layout of the UI presented by the target application that is currently being driven in the device 1'A with the screen layout of the UI that is for each recipient candidate device, and extracts the change. The user is notified of the extracted change from the display part 16 or an audio output part (not shown) of the device 1'A. In this way, in the third system configuration, the device 1'A, which is a transmitting source, acquires the pieces of output environment information of the respective device 1'B to 1'F, which are recipient candidates, from the UI management server 3, and determines the screen layout of the UI in each recipient candidate device.

3. Operation Processing

Next, operation processing of the recipient device changing system according to the present embodiment will be described. Here, with reference to FIG. 5, the operation processing in the first system configuration shown in FIG. 1 and FIG. 2 will be described as an example.

Figure 5:
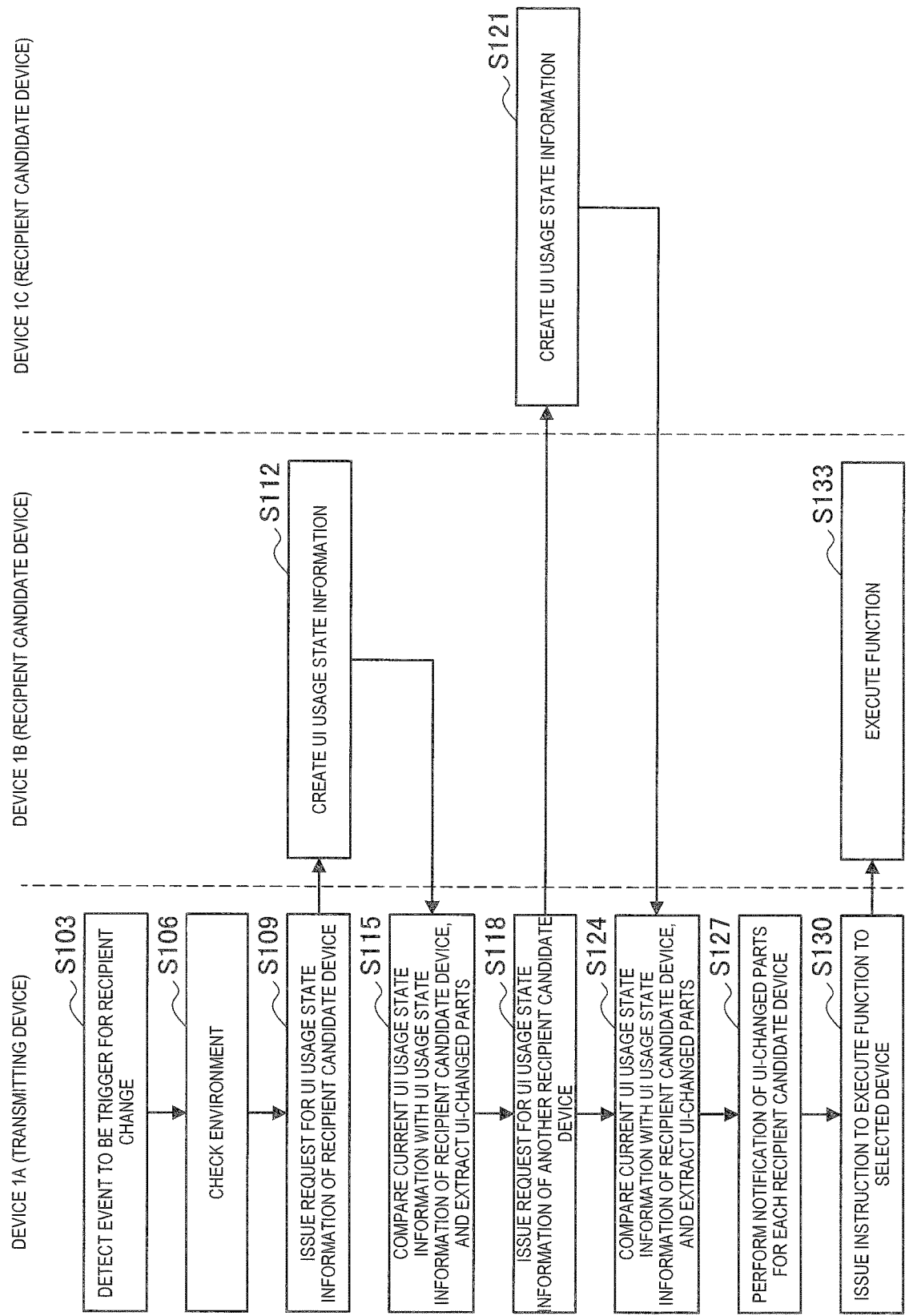
FIG. 5 is a flowchart showing operation processing of the recipient device changing system according to the present embodiment.

FIG. 5 is a flowchart showing operation processing of the recipient device changing system according to the present embodiment. As shown in FIG. 5, first, in Step S103, the environment information acquisition part 12 of the device 1A (transmitting device) that is currently executing an application detects an event that becomes a trigger for a recipient change. Examples of the event that becomes the trigger include the cases where the environment that surrounds the device 1A changes, such as the case where the device 1A comes close to another device, the case where the number of users increases from one to two, and the case where the state of the user holding the device 1A changes from a running state to a walking state. Further, the event that becomes a trigger also includes a case where there is an operation of calling a recipient changing menu performed by the user.

Next, in Step S106, the environment information acquisition part 12 of the device 1A checks the environment. To be specific, the environment information acquisition part 12 collects elements that influence the UI in the environment that surrounds the target application, such as a function of an application to be a target, a display layout of the function, a function-available status, an environment of a device located nearby, and a change in a status of a user (whether running or walking, and the number of users) or an action.

Next, in Step S109, the device 1A issues a request for UI usage state information to a recipient candidate device. To be specific, in order to check how the target application is executed on the recipient candidate device, the environment information acquisition part 12 of the device 1A transmits the information of the element that influences the UI, such as the function of the target application and the status of the user which are collected in S106, from the communication part 11 to the recipient candidate device.

Next, in Step S112, the UI management part 15 of the device 1B (recipient candidate device) creates UI usage state information indicating that in what state the target application is executed. Here, with reference to FIG. 6, there will be described the fact that the state in which the target application is executed (screen layout of UI) differs for each output environment (for each resolution).

Figure 6:
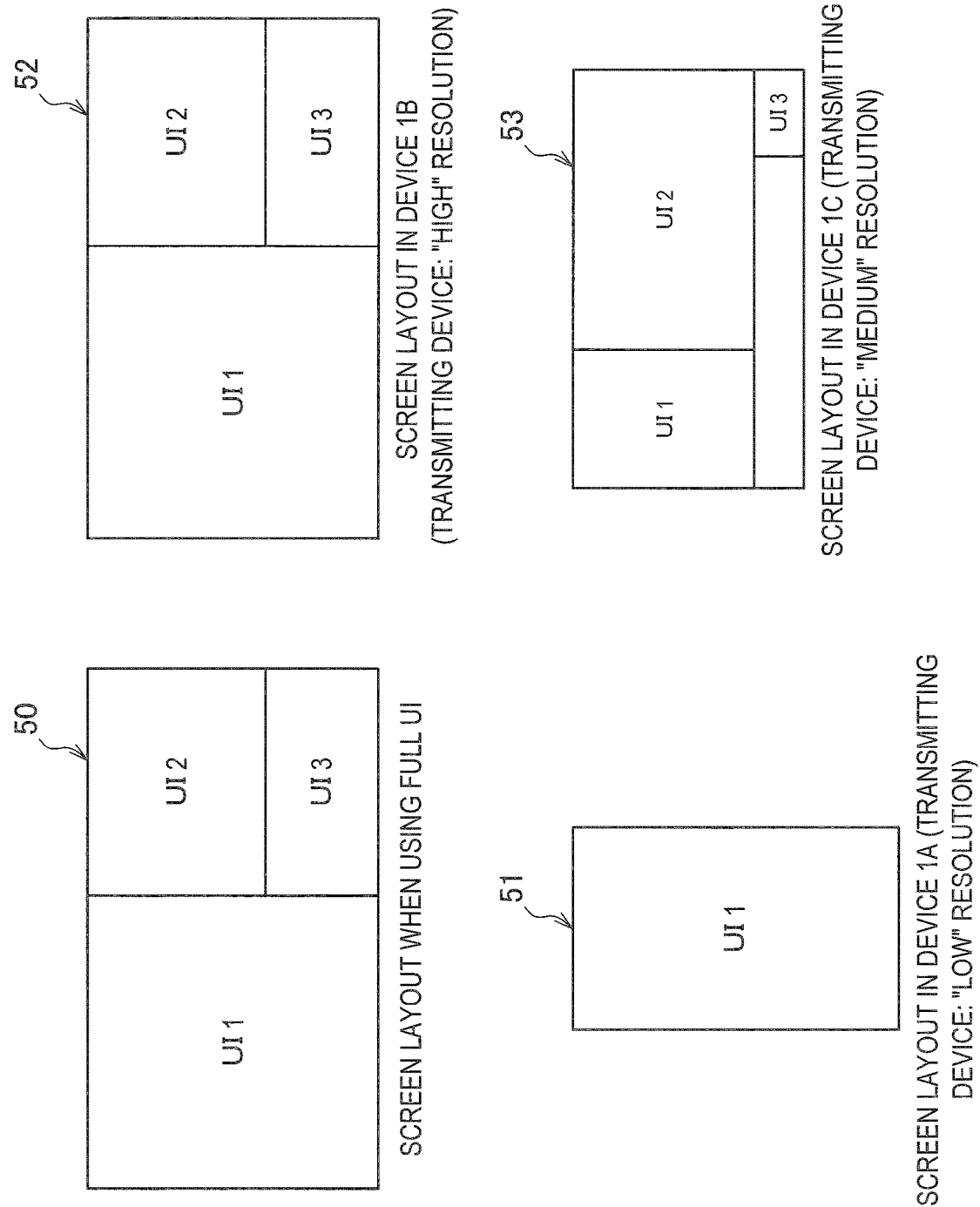
FIG. 6 is a diagram showing a UI screen layout for each device when executing a target application.

FIG. 6 is a diagram showing a UI screen layout for each device when executing a target application. As shown in FIG. 6, when using a full UI, a screen layout 50 displaying the function of the target application includes all UI's, that is, a UI1, a UI2, and a UI3. On the other hand, in the device 1A whose resolution is "low", a screen layout 51 displaying the function of the target application includes only the UI1, and the UI2 and the UI3 are not available. Further, in the device 1B whose resolution is "high", a screen layout 52 displaying the function of the target application includes the UI1, the UI2, and the UI3, and the full UI is available. Further, in the device 1C whose resolution is "medium", a screen layout 53 displaying the function of the target application includes the UI1, the UI2, and the iconized UI3, and the UI3 is available but is iconized.

Figure 7:
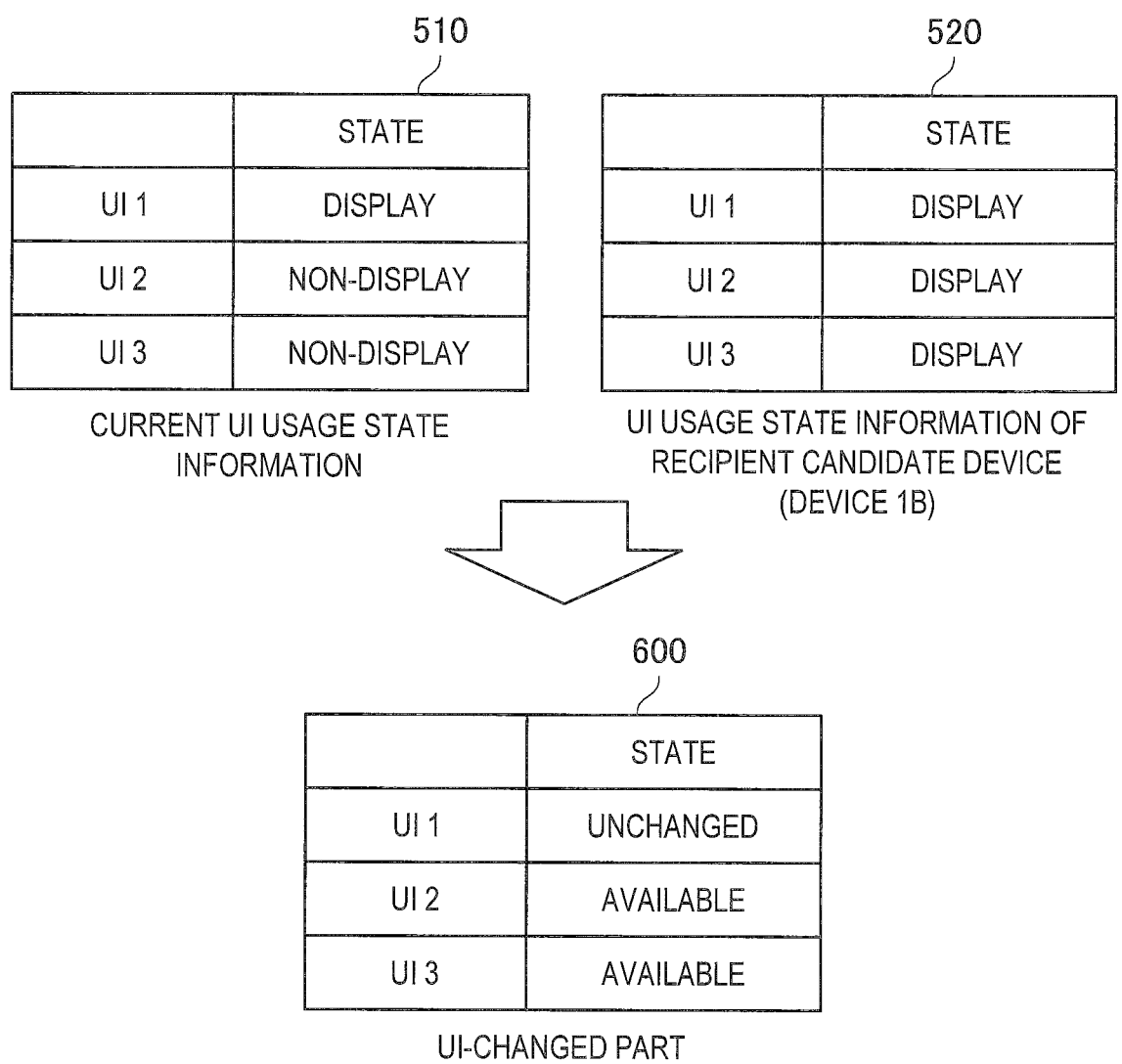
FIG. 7 is a diagram illustrating a comparison between current UI usage state information and UI usage state information of a recipient candidate device.

In this way, the execution state (to be specific, screen layout of UI) of the target application differs depending on the output environment (here, resolution, as an example) of each device. The device 1B transmits, as the UI usage state information, information of the screen layout 52 of the UI's in the case of executing the target application to the device 1A (transmitting device). Subsequently, in Step S115 shown in FIG. 5, the UI management part 15 of the device 1A compares the current UI usage state information with the UI usage state information of the recipient candidate device (device 1B), and extracts changed parts of the UI's. With reference to FIG. 7, the extraction of the changed parts obtained by the comparison between the pieces of UI usage state information will be described.

FIG. 7 is a diagram illustrating a comparison between current UI usage state information 510 and UI usage state information 520 of a recipient candidate device (device 1B). In the example shown in FIG. 7, the case is described where the environment changes from the device 1A whose resolution is "low" to the device 1B whose resolution is "high", and, comparing the UI usage state information 510 with the UI usage state information 520, changes are found in the UI2 and the UI3. That is, in the current UI usage state information 510, the UI2 and the UI3 are each in a non-display state, but on the other hand, in the UI usage state information 520 of the device 1B that is a recipient candidate, the UI2 and the UI3 are each in a display state. As a result of the comparison, as shown in FIG. 7, UI-changed part information 600 is acquired indicating that the UI1 is unchanged (continuously available) and the UI2 and the UI3 become available (changed). Subsequently, in Step S118 shown in FIG. 5, the device 1A issues a request for UI usage state information to another recipient candidate device (device 1C).

Next, in Step S121, the UI management part 15 of the device 1C (recipient candidate device) creates UI usage state information indicating that in what state the target application is executed. The screen layout 53 of UI's during target application execution in the device 1C whose resolution is "medium" is as described with reference to FIG. 6. The device 1C transmits, as the UI usage state information, information of the screen layout 53 of the UI's in the case of executing the target application to the device 1A (transmitting device).

Figure 8:
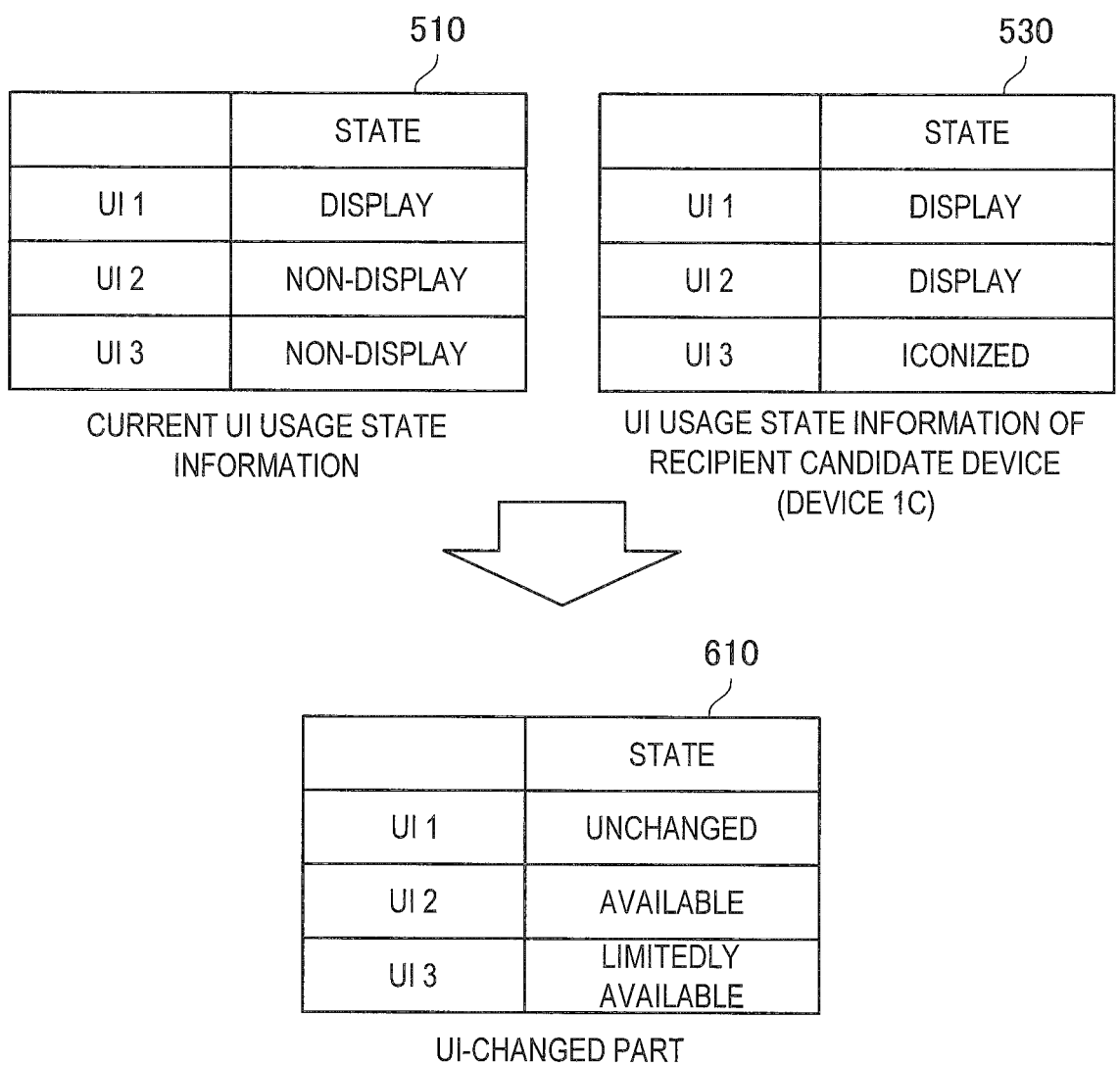
FIG. 8 is a diagram illustrating a comparison between current UI usage state information and UI usage state information of a recipient candidate device.

Next, in Step S124, the UI management part 15 of the device 1A compares the current UI usage state information with the UI usage state information of the recipient candidate device (device 1C), and extracts changed parts of the UI's. With reference to FIG. 8, the extraction of the changed parts obtained by the comparison between the pieces of UI usage state information will be described.

FIG. 8 is a diagram illustrating a comparison between current UI usage state information 510 and UI usage state information 530 of the recipient candidate device (device 1C). In the example shown in FIG. 8, the case is described where the environment changes from the device 1A whose resolution is "low" to the device 1C whose resolution is "medium", and, comparing the UI usage state information 510 with the UI usage state information 530, changes are found in the UI2 and the UI3. That is, in the current UI usage state information 510, the UI2 and the UI3 are each in a non-display state, but on the other hand, in the UI usage state information 530 of the device 1C that is a recipient candidate, the UI2 becomes a display state and the UI3 becomes an iconized display state. As a result of the comparison, as shown in FIG. 8, UI-changed part information 610 is acquired indicating that the UI1 is unchanged (continuously available), the UI2 becomes available (changed), and the UI3 becomes limitedly available (changed).

Figure 9:
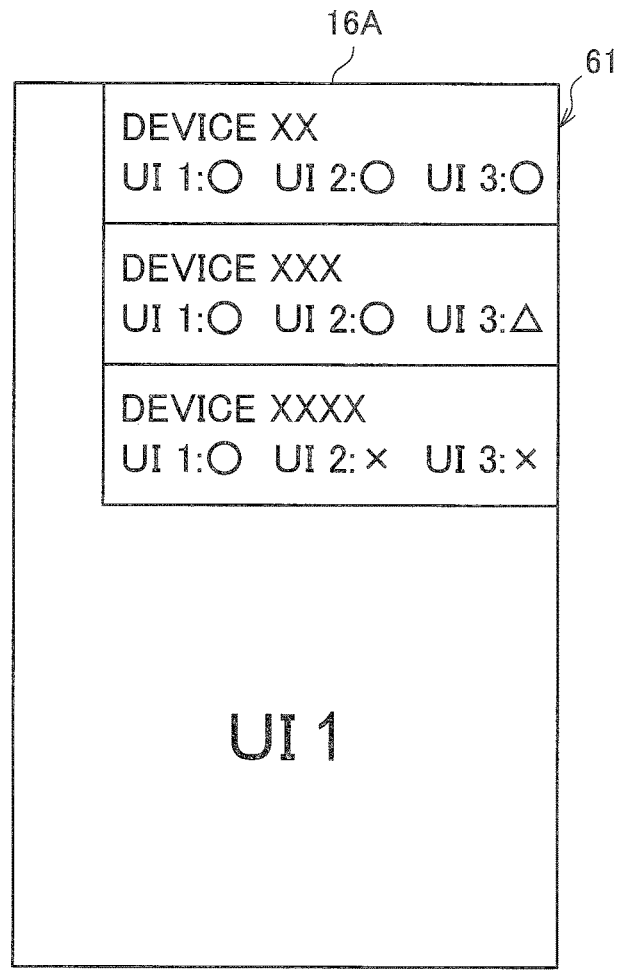
FIG. 9 is a diagram showing an example of a notification screen showing UI-changed parts according to the present embodiment.

Next, in Step S127 of FIG. 5, the UI management part 15 of the device 1A performs control in a manner that recipient candidate devices are displayed on the display part 16 together with pieces of UI-changed part information for the respective recipient candidate devices, and the notification thereof is performed to a user. Here, FIG. 9 shows an example of a notification screen showing UI-changed parts according to the present embodiment. In the example shown in FIG. 9, the UI1 is displayed on the display part 16A of the device 1A in which a target application is currently executed. As shown in FIG. 9, the UI management part 15 of the device 1A displays a notification screen 61 in which a UI-availability status for each recipient candidate device is written in text format on the UI1, and thus can notify the user of the UI-changed parts. To be specific, in the case where the output destination is changed to a device XX, the notification screen 61 shows that the UI1, the UI2, and the UI3 are each in the available state, and in the case where the output destination is changed to a device XXX, the notification screen 61 shows that the UI and the UI2 each become the available state and the UI3 becomes a limited available state.

In addition, in the case where the output destination is changed to a device XXXX, it is shown that the UI1 becomes the available state, but that the UI2 and the UI3 are each in the unavailable (non-display) state. The user takes into an account the change of UI's for each device by referring to the notification screen 61, and determines which device the user is going to change the output destination to. Since the notification screen 61 also has a function as a selection screen for allowing the user to select the device to be changed to, the user can select the recipient device by tapping the display region of the device that the user has determined for the device to be changed to among the devices included in the notification screen 61.

Figure 10:
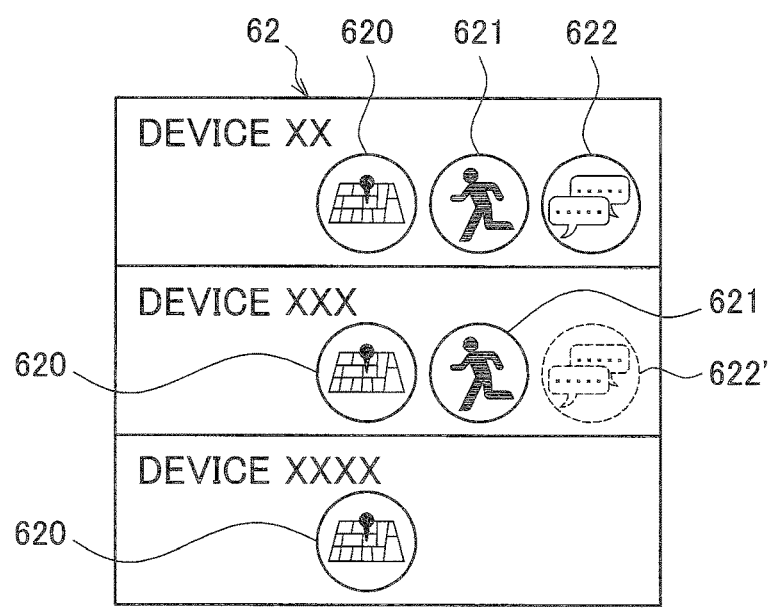
FIG. 10 is a diagram showing an example of another notification screen showing UI-changed parts according to the present embodiment.

Note that the notification of the UI-changed parts is not limited to the notification screen 61 in the text format, and may use a graphical expression by using icons and the like, for example. Hereinafter, another notification screen will be described with reference to FIG. 10. FIG. 10 is a diagram showing an example of another notification screen showing UI-changed parts according to the present embodiment. As shown in FIG. 10, the UI management part 15 displays a notification screen 62 in which a UI-availability status for each recipient candidate device is drawn in icon(s), and thus can notify the user of the UI-changed parts. To be specific, in the notification screen 62, the icon/icons is/are displayed indicating available UI/UI's for each device.

For example, for the device XX, there are displayed an icon 620 representing a UI of a map, an icon 621 representing a UI of exercise information, and an icon 622 representing a UI of a comment posted by an acquaintance, which show that those UI's are in the available states. Further, for the device XXX, there are displayed the icon 620 and the icon 621, which show that those UI's are in the available states. In addition, the icon representing the UI of a comment posted by an acquaintance is displayed by an icon 622' expressed in color or in dotted line, and this shows that the UI is in the limited available state. Still further, for the device XXXX, there is only displayed the icon 620 representing a UI of a map, which shows that the UI of the map is in the available state, but the other UI's are in unavailable (non-display) state. Heretofore, the UI-changed part notification for each recipient candidate device according to the present embodiment has been described in detail.

Next, in Step S130 of FIG. 5, the UI management part 15 of the device 1A transmits a command to execute the function of the target application to the device (recipient device) that is selected by the user as the output changed destination (recipient). To be specific, the UI management part 15 transmits, to the selected device (here, device 1B, for example), information (context) indicating the current state of the target application and the target application if necessary, and issues an instruction to output the function of the target application. After that, in Step S133, the function driving part 14 of the device 1B executes the function of the target application in accordance with the instruction from the device 1A, which is the transmitting device.

4. Specific Notification Example

Heretofore, operation processing of the recipient device changing system according to the present embodiment has been described. Subsequently, UI-changed notification for each recipient device according to the present embodiment will be described with reference to specific examples.

<4-1. UI-Change Notification in Accordance with Change of Devices>

First, with reference to FIGS. 11 to 13, there will be described a specific UI-changed notification example in the case where UI's change in accordance with performances of recipient candidate devices (here, resolution and direction of terminal). Here, as an example of the target application, a music player application is executed. In the music player application, there may be displayed UI's of "jacket photo", "playback information" indicating a music name and a playback position, "controller" for performing operations such as playback and pause, and "music list".

Figure 11:
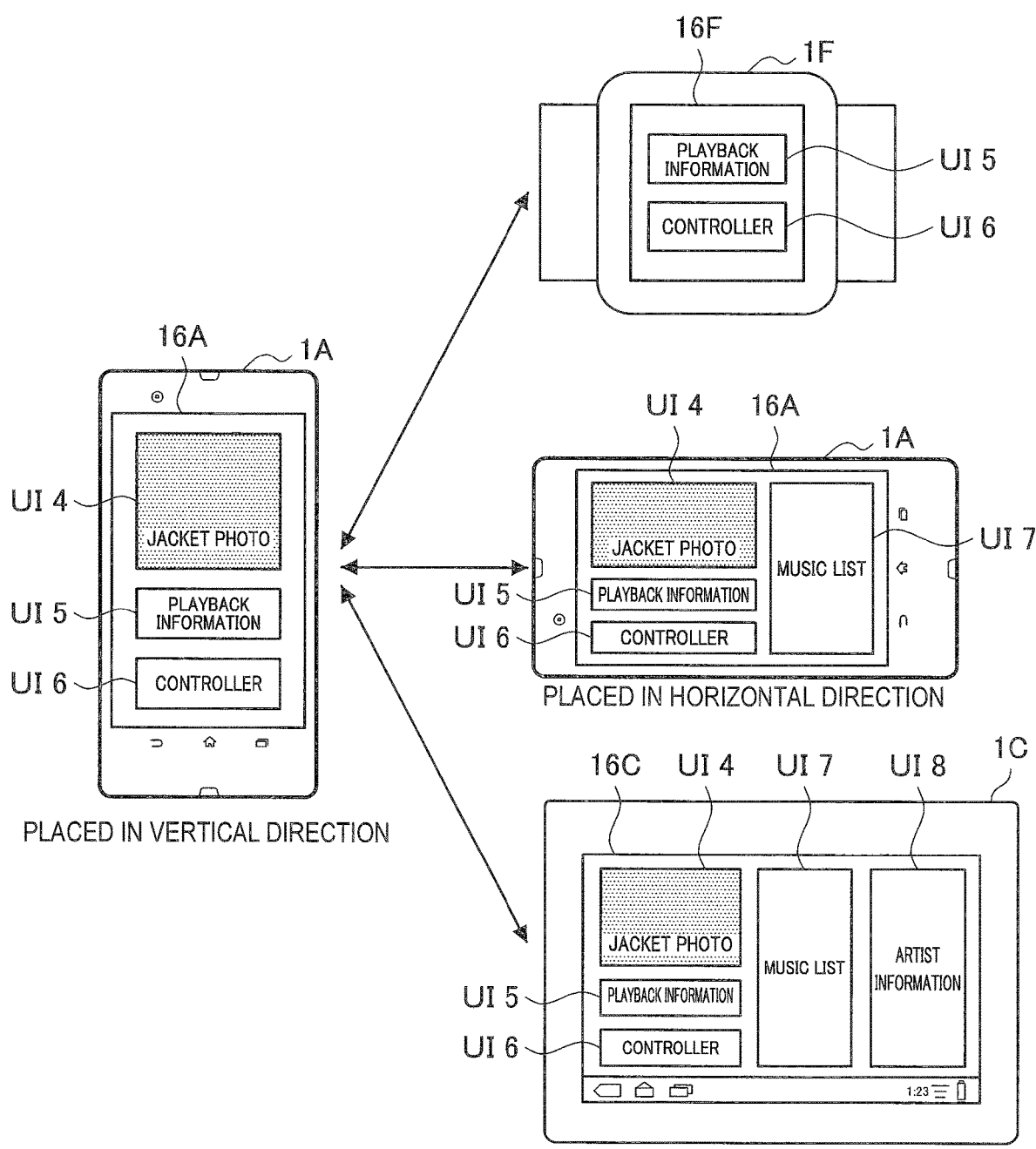
FIG. 11 is a diagram illustrating changes in UI's in accordance with performances of respective devices.

FIG. 11 is a diagram illustrating changes in UI's in accordance with performances of respective devices. As shown in FIG. 11, in the case where the device 1A (smartphone) is placed in the vertical direction, the functional UI's presented by the music player application on the display part 16A are a UI4 of a jacket photo, a UI5 of playback information, and a UI6 of a controller. In the present embodiment, if the longitudinal direction of the device 1A is substantially perpendicular to the horizontal direction, the longitudinal direction is referred to as the vertical direction.

Further, in the case of the device 1F (watch-type device), the functional UI's presented by the music player application on a display part 16F are the UI5 of the playback information and the UI6 of the controller. In the present embodiment, since the resolution of the device 1F is lower than the resolution of the device 1A, the UI4 of "jacket photo" is hidden.

Further, in the case where the device 1A is placed in the horizontal direction, the functional UI's presented by the music player application on the display part 16A are the UI4 of the jacket photo, the UI5 of the playback information, the UI6 of the controller, and a UI7 of a music list. Note that, in the present embodiment, even the same device 1A is included in one of the recipient candidate devices when the direction (display direction) is different. In addition, in the case of the device 1C (tablet terminal), the resolution of the device 1C is higher than the resolution of the device 1A, the functional UI's presented by the music player application on a display part 16C are the UI4 of the jacket photo, the UI5 of the playback information, the UI6 of the controller, the UI7 of the music list, and a UI8 of artist information.

In this way, in the case where the screen layouts of the display screens differ from each other in accordance with the performances of the recipient candidate devices, the UI management part 15 of the device 1A is capable of extracting UI-changed parts before actually changing the output destination, and notifying the user of how the UI's change for each device. Here, FIG. 12 shows a notification example of the changed part(s) in functional UI('s) for each device presented by the music player application.

Figure 12:
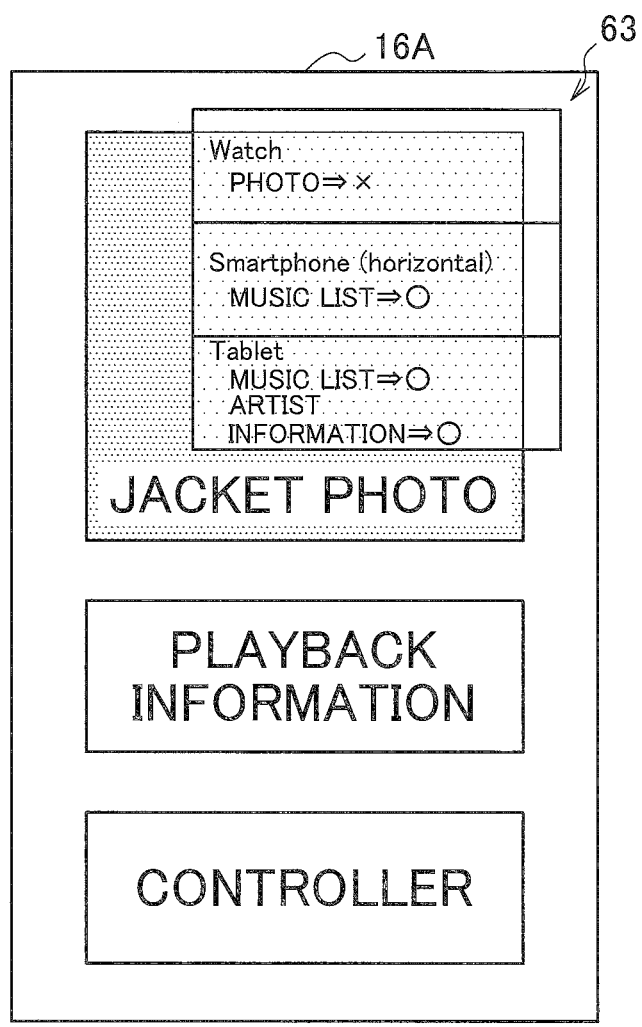
FIG. 12 is a diagram showing a notification example of changed part(s) in functional UI('s) for each device presented by a music player application.

The notification screen 63 shown in FIG. 12 is displayed on the display part 16A in a superimposed manner on the functional UI currently being presented by the music player application. Further, on the notification screen 63, only the parts that are going to be changed from the functional UI currently being presented by the music player application are shown. To be specific, in the case of the device 1F of a watch-type device, for example, since the UI4 of the jacket photo is hidden as shown in FIG. 11, "Watch: photo→×" is shown on the notification screen 63 shown in FIG. 12. Further, in the device 1A placed in the horizontal direction, since the UI7 of the music list is displayed in addition to the present UI's, "Smartphone (horizontal): music list→○" is shown on the notification screen 63.

In addition, in the device 1C of a tablet terminal, since the UI7 of the music list and the UI8 of the artist information are displayed in addition to the present UI's, "Tablet: music list→○, artist information→○" is shown on the notification screen 63. In this way, the UI management part 15 can perform notification of the UI's that differ in accordance with the performances of the recipient candidate devices by showing the parts that change from the present UI's, that is, UI's that is to be displayed or to be hidden. Accordingly, in the case where the user wants to see the "music list", for example, the change of the UI's for each recipient candidate device can be checked in advance, without taking time and effort of actually displaying and checking the change of the UI's on the recipient candidate device. Further, from the example shown in FIG. 12, it can be seen that the "music list" is displayed only by placing the device 1A currently executing the target application in the horizontal direction.

Heretofore, a specific UI-changed notification example in the case where UI's change in accordance with performances of a recipient candidate devices has been described. Note that, the notification method of the UI change is not limited to the example shown in FIG. 12, and a thumbnail image of the display screen after the change for each recipient candidate device may be used. Hereinafter, the description will be made with reference to FIG. 13.

Figure 13:
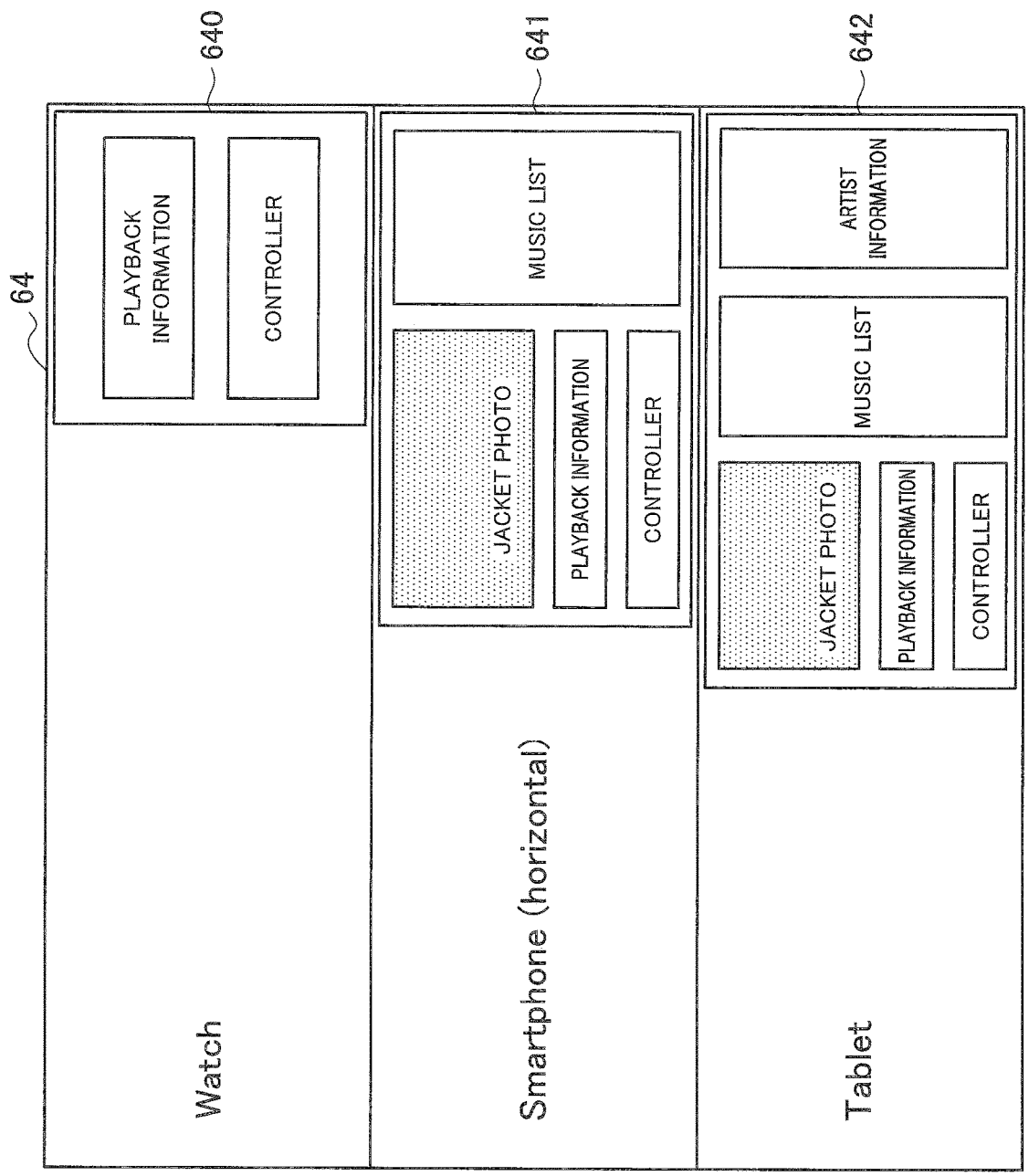
FIG. 13 is diagram showing another notification example of changed part(s) in functional UI('s) for each device presented by a music player application.

FIG. 13 is diagram showing another notification example of changed part(s) in functional UI('s) for each device presented by a music player application. As shown in FIG. 13, a notification screen 64 displayed on the display part 16A of the device 1A includes thumbnail images 640, 641, and 642 for the respective recipient candidate devices. In this way, the UI management part 15 can intuitively notify the user of the UI-changed parts by using thumbnail images of the changed UI's.

<4-2. UI-Changed Notification Triggered by Change in User Environment>

Subsequently, with reference to FIG. 14, UI-changed notification triggered by change in a user environment will be described. For example, when there is change in the users of a device, there may be a case where a given function is added depending on the application. Accordingly, the UI management part 15 detects, in addition to the case where the user voluntarily issues an instruction to change the recipient device, the case where the user environment is changed as an event that becomes a trigger of change in the recipient.

Figure 14:
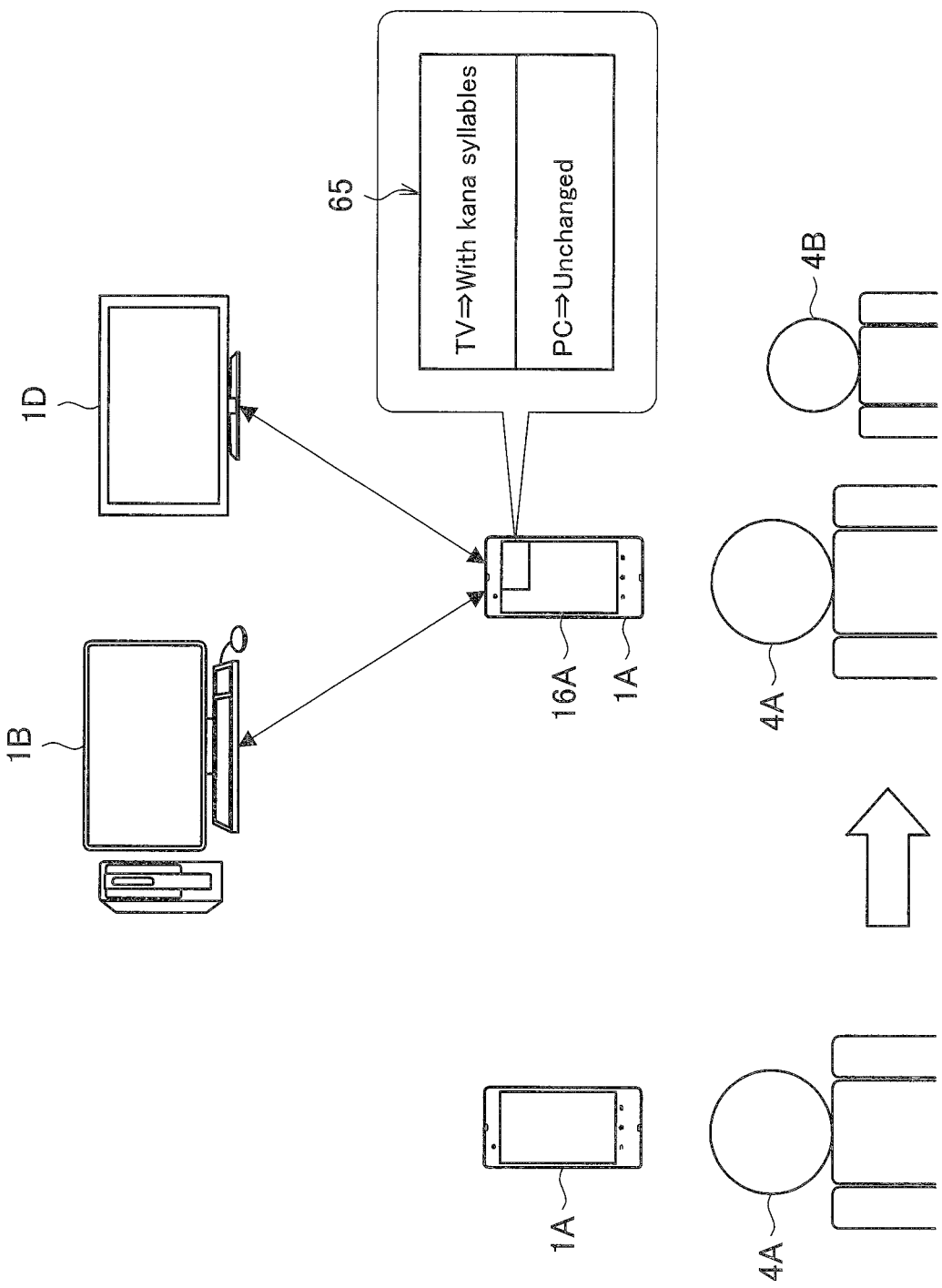
FIG. 14 is a diagram illustrating UI-changed notification when the number of users increases.

FIG. 14 is a diagram illustrating UI-changed notification when the number of users increases. For example, in the case where there is a change in the environment from the environment in which only a parent (adult) 4A uses the device 1A to the environment in which the parent 4A and a child 4B use the device 1A, a function of the target application may present kana syllables (written above Chinese characters to aid in reading) as additional information so as to respond to the child who cannot read kanji (Chinese character). As for the change in the environment of the users, facial recognition of the users is performed by a camera mounted on the device 1A, and the change is detected as an event to be a trigger.

In the case where the child is included in the user, the UI management part 15 of the device 1A acquires UI usage state information from the device 1B (PC) and the device 1D (TV) located nearby, and causes the display part 16A to display a notification screen 65 showing UI-changed parts. As shown in FIG. 14, the notification screen 65 shows that if the output destination is changed to the TV (device 1D), the display will be shown with kana syllables, and, if the output destination is changed to the PC (device 1B), there is no change. Accordingly, also in the case where the user environment has been changed, the optimum recipient device selection can be performed without actually performing previewing on the recipient candidate device.

<4-3. UI-Change Notification in Accordance with Characteristics of Recipient Candidate Devices and Types of Display Contents>

Figure 15:
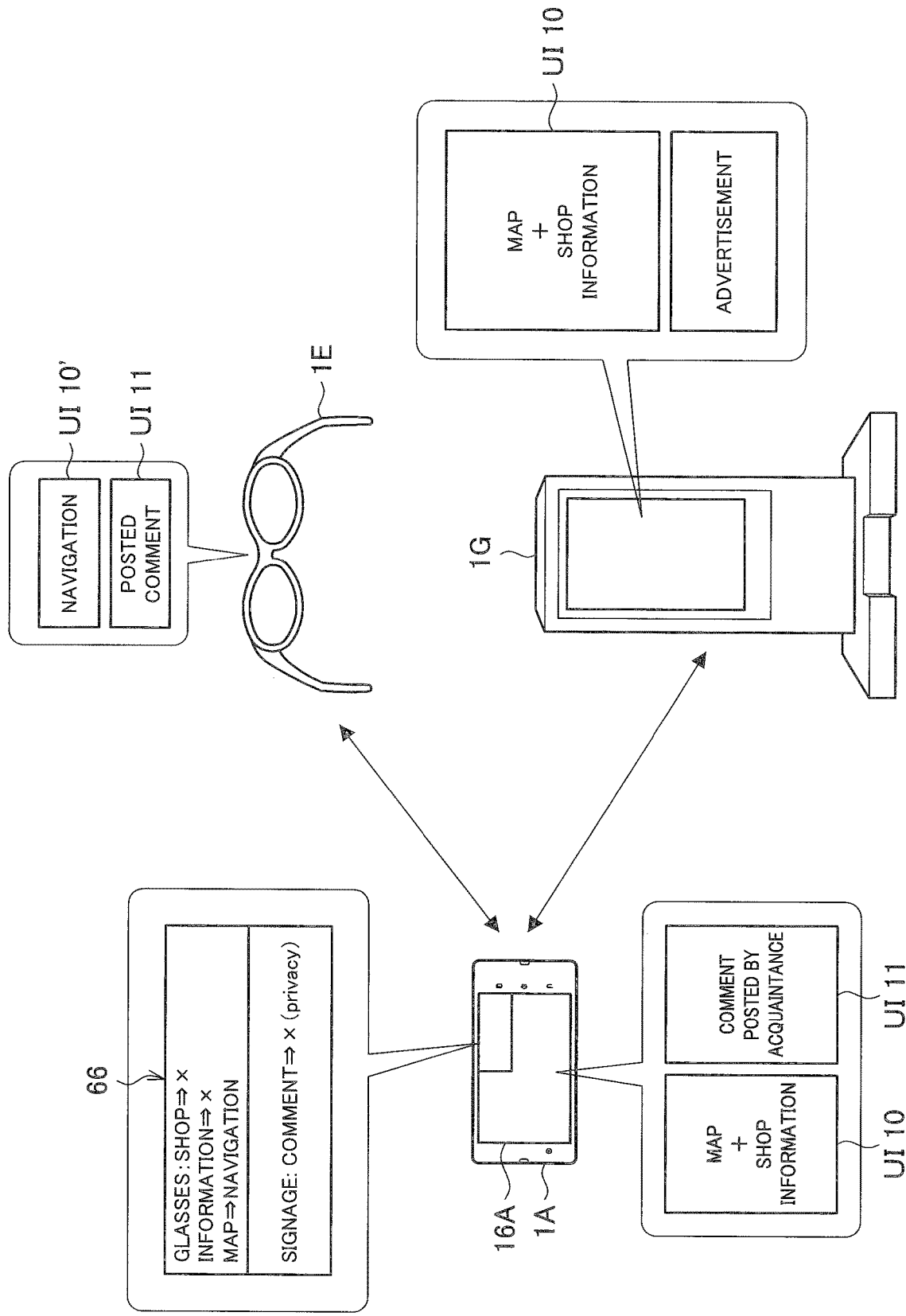
FIG. 15 is a diagram showing a notification example when UI's change in accordance with characteristics of recipient candidate devices and types of display contents.

FIG. 15 is a diagram showing a notification example when UI's change in accordance with characteristics of recipient candidate devices and types of display contents. In the present embodiment, let us assume the case where the display screen of the device 1A (smartphone) to be a transmitting device is formed of a UI10 including "map information" and "shop information" and a UM including "comment posted by acquaintance" containing private information. The "map information" included in the UI10 shows a current point of the user and a route from a given start point to a shop on the map, for example.

Here, in the case where the output destination of the UI is changed to the device 1E which is a glasses-type HMD whose display part is transparent, since the display region of the UI is generally controlled to be small so as not to interrupt user's field of vision, there is presented a UI10' in which the "shop information" is omitted and the "map information" is switched to a function of "navigation". The UI10' of "navigation" is a guide that shows a route in a text form. Note that, in the device 1E, there may also be a case where the text navigation is switched to an audio navigation and the UI10' is hidden. Further, the UM including the "comment posted by acquaintance" containing private information becomes available in the device 1E, because the device 1E has characteristics in that it is a private device which only a person wearing the device 1E can perform the viewing.

On the other hand, in the case where the output destination of the UI is changed to a device 1G which is a digital signage, since the resolution of the device 1G is high, the UI10 including the "map information" and the "shop information" are not changed and are output as they are. Further, the UM including the "comment posted by acquaintance" containing private information is not displayed on the device 1G, because the device 1G has characteristics in that it is a public device which is installed outside or shop front. Note that, since the device 1G is the digital signage, the device 1G may display the UI10 in cooperation with the device 1A, and may also continuously display an advertisement, a vicinity map, and the like as shown in FIG. 15.

The UI management part 15 of the device 1A acquires UI usage state information that changes in accordance with characteristics of devices of the output destinations as described above from each of the devices 1E and 1G, and causes the display part 16A to display a notification screen 66 showing UI-changed parts. As shown in FIG. 15, the notification screen 66 shows that, if the output destination is changed to the glasses-type HMD (device 1E), the "shop information" is not shown and the "map information" is changed to the "navigation", and, if the output destination is changed to the digital signage (device 1G), the "comment posted by acquaintance" is not shown taking into account the privacy. Accordingly, the user can grasp in advance that private information is not displayed on the public device 1G, and thus can securely perform cooperation of the private device 1A that the user possesses with the public device 1G such as the digital signage.

<4-4. UI-Changed Notification when Output is Performed by Multiple Recipient Candidate Devices>

Each embodiment described above assumes a case where any one device among multiple recipient candidate devices is selected, but the present embodiment is not limited thereto, and it is also possible to divide and display a UI between multiple devices, for example. Hereinafter, specific example thereof will be described with reference to FIG. 16.

Figure 16:
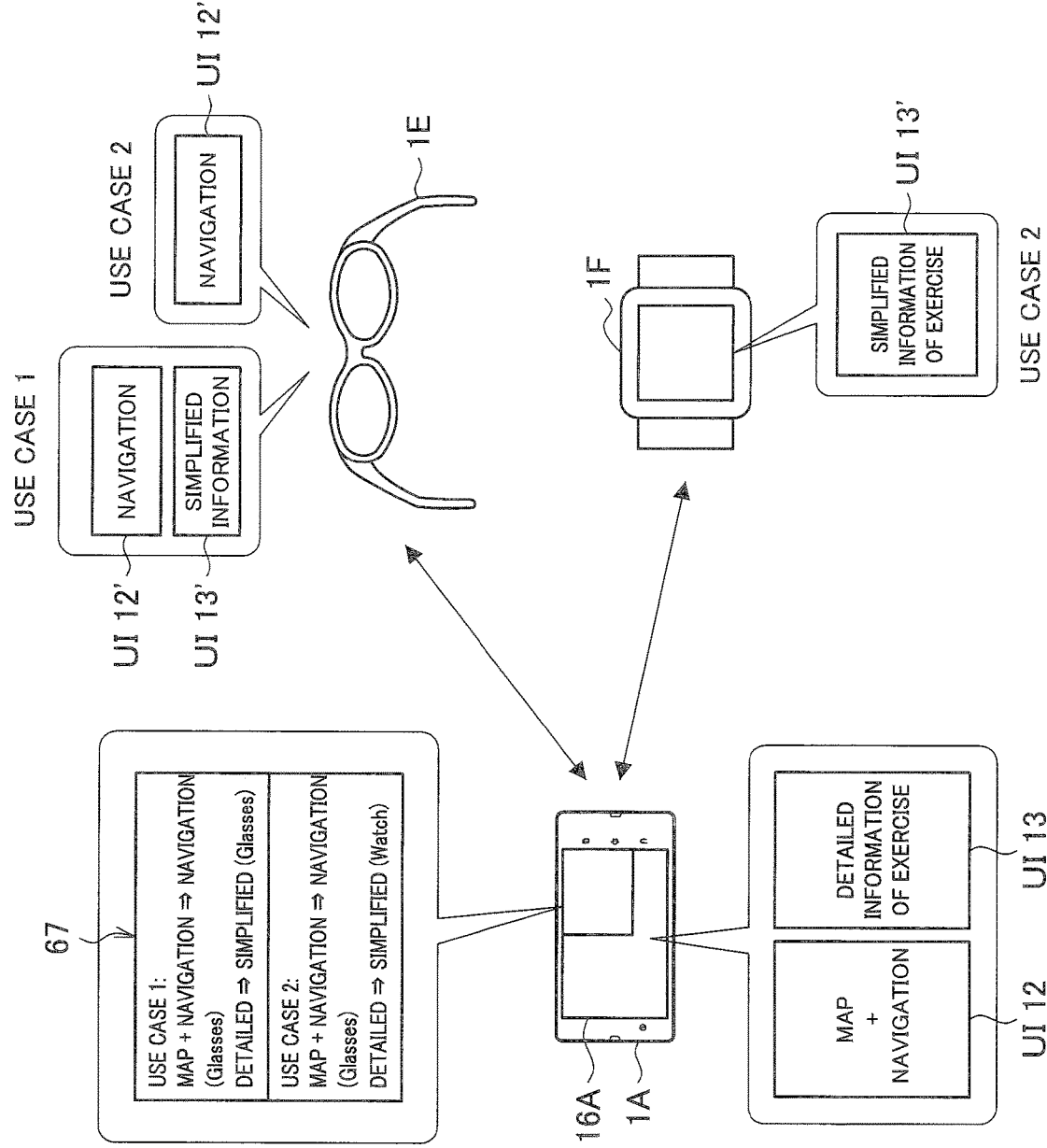
FIG. 16 is a diagram showing a notification example of changes in UI's when output is performed by multiple recipient candidate devices.

FIG. 16 is a diagram showing a notification example of changes in UI's when output is performed by multiple recipient candidate devices. Here, an exercise application for running is executed as an example of a target application. In the present embodiment, let us assume that the display screen of the device 1A (smartphone) to be the transmitting device is formed of a UI12 of "map information" and "navigation information" and a UI13 of "detailed information of exercise". The UI13 of the "detailed information of exercise" includes information such as a travel distance, a travel time, calories burned, and a heart rate.

Since the exercise application for running continuously acquires information such as a running route, a running time, a speed, and a heart rate during running, it is desired that the operation is collectively performed by the device 1A (smartphone) before running and then is switched to a wearable device during running Examples of the wearable device include the device 1E which is a glasses-type HMD and the device 1F which is a watch-type device, as shown in FIG. 16, for example. Here, the output destination of the UI may be any one of or both of the device 1E, which is the glasses-type HMD and the device 1E, which is the watch-type device. In the case where the both devices are selected as the output destinations, the current UI is displayed in a divided manner.

There will be described a case where the output destination is changed to any one of the devices as a use case 1. To be specific, for example, in the case where the output destination is changed to only the device 1E as shown in FIG. 16, for example, there are displayed a UI12' in which the UI12 of the "map information" and the "navigation information" is changed into only the "navigation information", and a UI13' in which the UI13 of the "detailed information of exercise" is changed into "simplified information of exercise".

On the other hand, there will be described a case where the output destination is changed to the both devices as a use case 2. In this case, the UI's currently displayed on the device 1A is displayed in a divided manner. To be specific, as shown in FIG. 16, the device 1E displays the UI12' in which the UI12 of the "map information" and the "navigation information" is changed into only the "navigation information", and device 1F displays the UI13' in which the UI13 of the "detailed information of exercise" is changed into the "simplified information of exercise".

The UI management part 15 of the device 1A acquires, from each of the devices 1E and 1F, UI usage state information that changes in accordance with the use cases as described above, and causes the display part 16A to display a notification screen 67 showing UI-changed parts. As shown in FIG. 16, the notification screen 67 performs notification of the change in UI's in the use case 1 and the change in UI's in the use case 2.

To be specific, the use case 1 shows that the "map information" and the "navigation information" are changed into only the "navigation information" and the "navigation information" is displayed on the glasses-type HMD (device 1E), and the "detailed information of exercise" is changed into the "simplified information of exercise" and is displayed on the glasses-type HMD (device 1E). On the other hand, the use case 2 shows that the "map information" and the "navigation information" are changed into only the "navigation information" and the "navigation information" is displayed on the glasses-type HMD (device 1E), and the "detailed information of exercise" is changed into the "simplified information of exercise" and is displayed on the watch-type device (device 1F).

Since the notification screen 67 also has a function as a selection screen for allowing the user to select the device to be changed to, the user can select the recipient device among the cases included in the notification screen 67 by tapping the display region of the desired use case. In this way, by notifying the user in advance of what function is available in which device, including the case where the UI's are output from multiple devices in a divided manner, the user can select an optimum recipient candidate device.

5. Modified Example

Heretofore, the UI-changed notification according to the present embodiment has been described specifically. Subsequently, a modified example of a recipient device changing system according to the present embodiment will be described.

<5-1. Case of Selecting Device to be Output Destination for Each UI>

In each embodiment described above, the UI/UI's that changes/change is/are shown for each recipient candidate device, but the present embodiment is not limited thereto, and it is also possible to select an output destination device for each UI, for example. Hereinafter, specific examples will be described with reference to FIG. 17.

Figure 17:
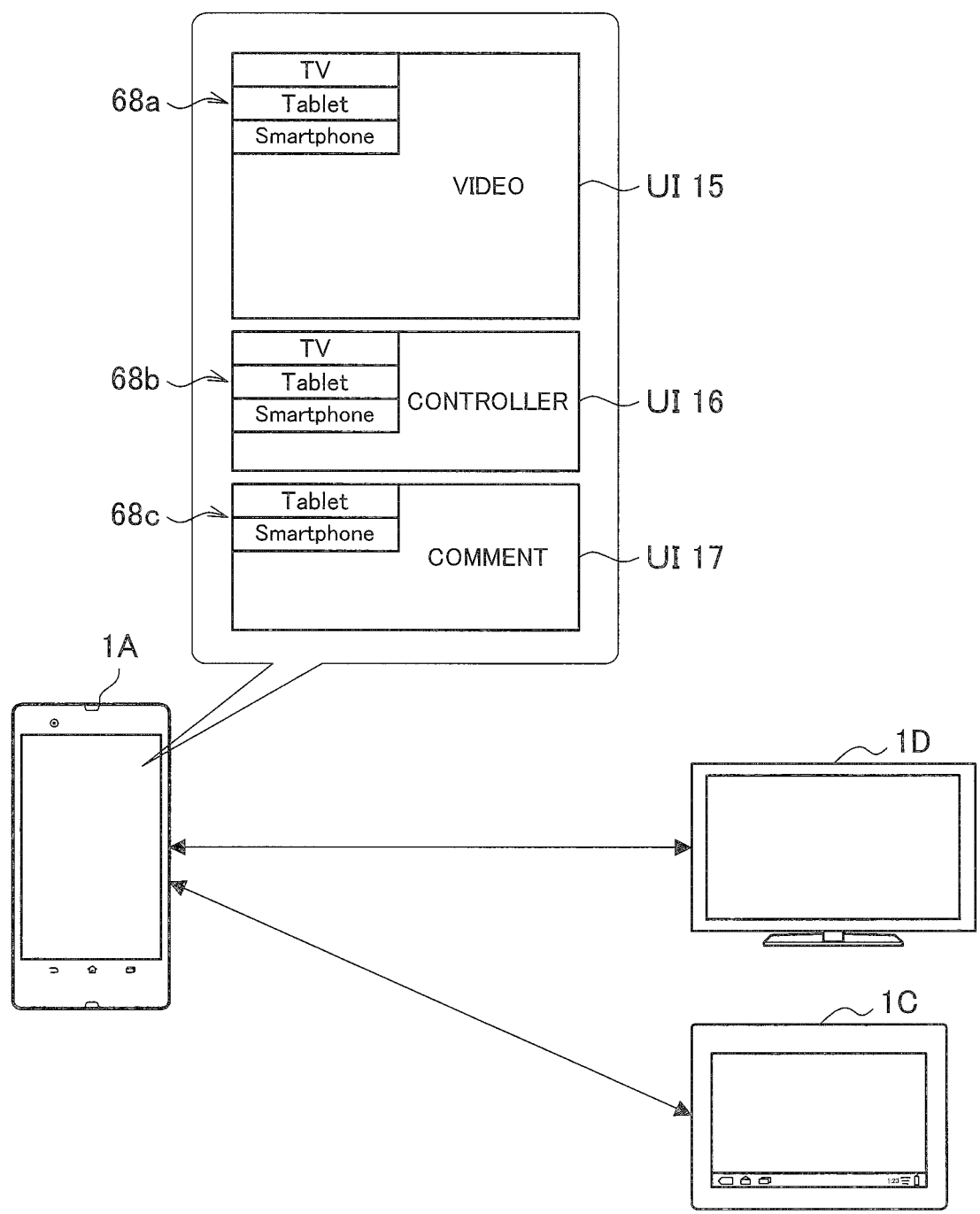
FIG. 17 is a diagram showing a screen example when an output destination device is selected for each UI.

FIG. 17 is a diagram showing a screen example when an output destination device is selected for each UI. Here, an application for playing back a movie is used as an example of a target application. As shown in FIG. 17, the device 1A executes the movie playback application, and presents a UI15 of a video, a UI16 of a controller for operation, and a UI17 of a comment posted to the video. For example, in the case where the user enjoys a movie using the movie playback application on the device 1A while being out, the device 1A detects, when the user returns home, the recipient candidate devices (devices 1C and 1D) from the surroundings. The detection of the recipient candidate devices corresponds to an event that becomes a trigger for changing the recipient, and the UI management part 15 of the device 1A acquires, from each recipient candidate device, UI usage state information in the case where the target application (here, movie playback application) is executed.

Then, the UI management part 15 of the device 1A determines, based on the UI usage state information acquired from each recipient candidate device, which of the recipient candidate devices each of the UI15, the UI16, and the UI17 currently being displayed is distributable to. After that, the UI management part 15 displays, as shown in FIG. 17, selection screens 68*a*, 68*b*, and 68*c* for allowing a recipient candidate device to be selected for each UI on the display regions of the respective UI15, UI16, and UI17.

To be specific, the selection screen 68*a* is displayed on the UI15 of the video, and is formed of selection buttons including the TV (device 1D) and the tablet (device 1C), which are devices capable of distributing the UI15 of the video. Further, the selection screen 68*b* is displayed on the UI16 of the controller, and is formed of selection buttons including the TV (device 1D) and the tablet (device 1C), which are devices capable of distributing the UI16 of the controller. Further, the selection screen 68*c* is displayed on the UI16 of the posted comment, and is formed of selection buttons including the tablet (device 1C), which is a device capable of distributing the UI16 of the controller. Note that each of the selection screens 68*a* to 68*c* includes a selection button of the smartphone (device 1A), and for the UI that is desired to be output continuously from the device 1A, it is possible to select the device 1A.

In this way, in the case where the user has been enjoying the movie on the device 1A (smartphone) while being out, for example, when returning home, the user can change the output destination of the video to the device 1D (TV), which has a higher resolution, and can change the output destination of the controller to the device 1C (tablet), which is placed beside the user. In this manner, the output destinations of the multiple UI's presented by the device 1A can be specified to the respective optimum devices.

<5-2. Case where Recipient Candidate Device is Placed Far Away>

In the embodiment described above, the devices 1B to 1F, which are the recipient candidates, are present around the device 1A, which is a transmitting device, and the fact that the device 1A comes close to the recipient candidate devices 1B to 1F triggers the UI-changed notification for each recipient candidate device. However, the present embodiment is not limited thereto, and the device 1A which is a transmitting device is also capable of performing the UI-changed notification for each recipient candidate device that is placed far away, for example.

To be specific, for example, in a system configuration in which the UI management server 3 shown in FIG. 4 are connected to each of the devices 1'A to 1'F through a network, the device 1'A which is a transmitting device is capable of performing the UI-changed notification of a recipient candidate device placed far away. The UI management part 15' of the device 1'A which is a transmitting device acquires output environment information of each recipient candidate device stored in the UI management server 3, determines a screen layout (UI usage state information) of a UI presented by a target application in each recipient candidate device, and performs the UI-change notification. In this way, since the devices which are not placed close to the user currently using the device 1'A but are at places that the user can use if the user moves can be included in the recipient candidate devices, the user can perform more optimum selection.

6. Conclusion

As described above, the recipient device changing system according to the present disclosure can notify in advance the user of the change in the UI for each recipient candidate device without performing the previewing on the recipient candidate devices. Accordingly, before actually switching the recipient (output destination), the user can grasp the change in the UI for each recipient candidate device and can select an optimum UI. It should be understood by those skilled in the art that various modifications, combinations, sub-combinations and alterations may occur depending on design requirements and other factors insofar as they are within the scope of the appended claims or the equivalents thereof.

For example, it is also possible to create a computer program for causing hardware such as CPU, ROM, and RAM, which are built in the devices 1A to 1G, 1'A to 1'F, and the UI management device 2, to exhibit the same functions as those of device 1A to 1G, 1'A to 1'F, and the UI management device 2. Further, there is also provided a computer-readable storage medium having the computer program stored therein. Further, the effects described in this specification are merely illustrative or exemplified effects, and are not limitative. That is, with or in the place of the above effects, the technology according to the present disclosure may achieve other effects that are clear to those skilled in the art based on the description of this specification.

Additionally, the present technology may also be configured as below:

(1) An information processing apparatus including:

an extraction part configured to extract, when an output destination is changed to a recipient candidate device, a change in a screen layout determined in accordance with an output environment of the recipient candidate device; and a notification controller configured to perform control to execute notification of the change in the screen layout extracted by the extraction part.

(2) The information processing apparatus according to (1), wherein the notification controller executes the notification of the change in the screen layout using at least one of an audio, a text, and a diagram.

(3) The information processing apparatus according to (1) or (2), wherein the extraction part extracts, as the change in the screen layout, a difference between information included in a screen currently displayed by a target application and information included in a screen displayed on the recipient candidate device when the output destination is changed to the recipient candidate device.

(4) The information processing apparatus according to any one of (1) to (3), wherein, at a time at which a given trigger is detected, the extraction part starts the extraction of the change in the screen layout of a case where the output destination is changed to the recipient candidate device.

(5) The information processing apparatus according to any one of (1) to (4), wherein the notification controller executes notification of a screen layout for each recipient candidate device or a change in the screen layout on a notification screen using a text, an icon, and a thumbnail image, the notification screen being also a screen for selecting a recipient device.

(6) The information processing apparatus according to any one of (1) to (5), further including
a receiver configured to receive, from the recipient candidate device, information of a screen layout determined in accordance with the output environment of the recipient candidate device.

(7) The information processing apparatus according to any one of (1) to (5), further including
a receiver configured to receive, from the recipient candidate device, the output environment of the recipient candidate device.

(8) The information processing apparatus according to any one of (1) to (5), further including
a receiver configured to receive, from a server device, the output environment of the recipient candidate device.

(9) The information processing apparatus according to any one of (1) to (8),
wherein the recipient candidate device includes a transmitting device having different display directions.

(10) The information processing apparatus according to any one of (1) to (9), further including
a transmitter configured to transmit a command to start output by a target application to a determined recipient device.

(11) The information processing apparatus according to any one of (1) to (10), further including:
a determination part configured to determine a screen layout presented by a target application in accordance with an output environment of the information processing apparatus; and
a transmission controller configured to perform control so as to transmit, in response to a request from a transmitting device, information of the determined screen layout to the transmitting device.

(12) A control method including:
extracting, when an output destination is changed to a recipient candidate device, a change in a screen layout determined in accordance with an output environment of the recipient candidate device; and
performing control to execute notification of the change in the extracted screen layout.

(13) A program for causing a computer to function as
an extraction part configured to extract, when an output destination is changed to a recipient candidate device, a change in a screen layout determined in accordance with an output environment of the recipient candidate device; and
a notification controller configured to perform control to execute notification of the change in the screen layout extracted by the extraction part.

(14) A system including:
a transmitting device including
an extraction part configured to extract, when an output destination is changed to a recipient candidate device, a change in a screen layout determined in accordance with an output environment of the recipient candidate device,
a notification controller configured to perform control to execute notification of the change in the screen layout extracted by the extraction part, and
a transmitter configured to transmit a command to start output by a target application to a recipient device; and
a recipient device including
a receiver configured to receive the command to start output transmitted by the transmitting device, and
a function driving part configured to start the output by the target application on the basis of the received command.

What is claimed is:

1. An information processing apparatus, comprising:
a processor configured to:
execute a target application to present a user interface on a display screen of the information processing apparatus, wherein the user interface comprises a plurality of elements;
receive first screen layout information from at least one recipient candidate device based on output environment information of the at least one recipient candidate device, wherein
the at least one recipient candidate device is different from the information processing apparatus, and
the first screen layout information indicates a first display state of each element of the plurality of elements of the user interface of the target application at the at least one recipient candidate device;
determine second screen layout information that indicates a second display state of each element of the plurality of elements at the information processing apparatus;
determine, an availability status of each element of the plurality of elements of the user interface at the at least one recipient candidate device,
wherein
the availability status is determined based on the first screen layout information of the at least one recipient candidate device and the second screen layout information of the information processing apparatus, and
the availability status indicates that the first display state of each element of the plurality of elements in the first screen layout information of the at least one recipient candidate device is one of changed or unchanged as compared to the second display state of each element of the plurality of elements in the second screen layout information of the information processing apparatus;
display a notification screen on the display screen, wherein the notification screen includes a list including the at least one recipient candidate device and the availability status of each element of the plurality of elements of the user interface, wherein the availability status is as at least one of a text, an icon, or a thumbnail image; and
receive a user selection to select the at least one recipient candidate device to display the user interface of the target application at the at least one recipient candidate device, wherein the user selection is received based on the displayed notification screen.

2. The information processing apparatus according to claim 1, wherein the notification screen includes the availability status as at least one of an audio, a text, or a diagram.

3. The information processing apparatus according to claim 1, wherein the processor is further configured to
determine the availability status based on a difference between the first screen layout information and the second screen layout information.

4. The information processing apparatus according to claim 1, wherein the processor is further configured to receive, from the at least one recipient candidate device, the output environment information of the at least one recipient candidate device.

5. The information processing apparatus according to claim 1, wherein the processor is further configured to receive, from a server device, the output environment information of the at least one recipient candidate device.

6. The information processing apparatus according to claim 1, wherein the at least one recipient candidate device includes a transmitting device that displays the user interface in one of a first display direction or a second display direction perpendicular to the first display direction.

7. The information processing apparatus according to claim 1, wherein
the processor is further configured to transmit a command to the at least one recipient candidate device, and
the command causes the at least one recipient candidate device to display the user interface of the target application at a display screen of the at least one recipient candidate device.

8. The information processing apparatus according to claim 1, the processor is further configured to:
determine the second screen layout information based on output environment information of the information processing apparatus; and
transmit, based on a request from a transmitting device, the second screen layout information to the transmitting device.

9. A control method, comprising:
in an information processing apparatus:
executing a target application to present a user interface on a display screen of the information processing apparatus, wherein the user interface comprises a plurality of elements;
receiving first screen layout information from at least one recipient candidate device based on output environment information of the at least one recipient candidate device, wherein
the at least one recipient candidate device is different from the information processing apparatus, and
the first screen layout information indicates a first display state of each element of the plurality of elements of the user interface of the target application at the at least one recipient candidate device;
determining second screen layout information that indicates a second display state of each element of the plurality of elements at the information processing apparatus;
determining an availability status of each element of the plurality of elements of the user interface at the at least one recipient candidate device, wherein
the availability status is determined based on the first screen layout information of the at least one recipient candidate device and the second screen layout information of the information processing apparatus, and
the availability status indicates that the first display state of each element of the plurality of elements in the first screen layout information of the at least one recipient candidate device is one of changed or unchanged as compared to the second display state of each element of the plurality of elements in the second screen layout information of the information processing apparatus; and
displaying a notification screen on the display screen, wherein the notification screen includes a list including the at least one recipient candidate device and the availability status of each element of the plurality of elements of the user interface, wherein the availability status is as at least one of a text, an icon, or a thumbnail image; and
receiving a user selection to select the at least one recipient candidate device to display the user interface of the target application at the at least one recipient candidate device, wherein the user selection is received based on the displayed notification screen.

10. The information processing apparatus according to claim 1, wherein the first display state indicates that each element of the plurality of elements is one of displayed, refrained from display, or displayed as an icon.

11. The information processing apparatus according to claim 1, wherein the output environment information indicates at least one of a resolution of a display device of the at least one recipient candidate device or a type of the display device of the at least one recipient candidate device.

* * * * *